US006994332B2

(12) United States Patent
Goto et al.

(10) Patent No.: US 6,994,332 B2
(45) Date of Patent: Feb. 7, 2006

(54) ACTIVE VIBRATION DAMPING ACTUATOR AND ACTIVE DAMPING APPARATUS USING THE SAME

(75) Inventors: Katsuhiro Goto, Inuyama (JP); Hajime Maeno, Kasugai (JP); Kei Okumura, Kakamigahara (JP); Kazuhiko Kato, Komaki (JP); Kouichi Maeda, Nishikamo-gun (JP); Tetsuo Mikasa, Wako (JP); Hirotomi Nemoto, Wako (JP); Hiroaki Ue, Wako (JP); Ken Iinuma, Wako (JP)

(73) Assignees: Tokai Rubber Industries, Ltd., Komaki (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/808,924

(22) Filed: Mar. 24, 2004

(65) Prior Publication Data
US 2004/0188903 A1 Sep. 30, 2004

(30) Foreign Application Priority Data

Mar. 26, 2003 (JP) ............................. 2003-084424
Mar. 26, 2003 (JP) ............................. 2003-084433
Mar. 26, 2003 (JP) ............................. 2003-084474

(51) Int. Cl.
*F16F 13/00* (2006.01)
*F16J 15/52* (2006.01)
(52) U.S. Cl. ...................... 267/140.13; 16/74; 277/634
(58) Field of Classification Search ........... 267/140.11, 267/140.13, 140.14, 140.15; 248/562, 573, 248/575, 615; 16/49, 74, 86 A, 86 B; 277/628, 277/634
See application file for complete search history.

(56) References Cited

U.S. PATENT DOCUMENTS

| 2,268,718 | A | * | 1/1942 | Newton ......................... 338/8 |
| 5,655,569 | A | * | 8/1997 | Tackett ........................ 138/30 |
| 6,315,277 | B1 | * | 11/2001 | Nagasawa ............... 267/140.14 |
| 6,406,010 | B1 | * | 6/2002 | Yano et al. ............ 267/140.14 |
| 6,422,546 | B1 | | 7/2002 | Nemoto et al. |
| 6,588,737 | B2 | * | 7/2003 | Goto et al. ............. 267/140.14 |
| 2004/0086134 | A1 | | 5/2004 | Matsuoka et al. ......... 381/71.4 |

FOREIGN PATENT DOCUMENTS

| JP | 1158220 A | * | 6/1989 |
| JP | 8303322 A | * | 11/1996 |
| JP | 9-49541 | | 2/1997 |
| JP | 9-89040 | | 3/1997 |
| JP | 10-231886 | | 9/1998 |
| JP | 2001-1765 | | 1/2001 |
| JP | 2001-59540 | | 3/2001 |
| JP | 2004-052872 A | | 2/2004 |
| JP | 2004-076819 | | 3/2004 |

* cited by examiner

*Primary Examiner*—Melody M. Burch
(74) *Attorney, Agent, or Firm*—Beyer Weaver & Thomas LLP

(57) ABSTRACT

A vibration damping actuator including: a guide hole open onto a bottom face of a housing; a lid metal plate fitted into the opening of the guide hole with a size enough to hinder inward displacement thereof into the guide hole by an annular shoulder portion; an engaging groove disposed on an inner circumferential surface of the opening; a snap ring of C-letter shape fitted into the engaging groove to prevent the lid metal plate from becoming dislodged from the opening; and a sealing rubber layer formed covering an inside face of the lid metal plate. The lid metal plate is pressed by the snap ring so that the sealing rubber layer is pushed against the annular shoulder portion, thereby sealing the opening of the guide hole.

8 Claims, 10 Drawing Sheets

ACTIVE VIBRATION DAMPING ACTUATOR AND ACTIVE DAMPING APPARATUS USING THE SAME

INCORPORATED BY REFERENCE

The disclosure of Japanese Patent Application Nos. 2003-084424, 2003-084433, and 2003-084474, all filed on Mar. 26, 2003 including their specifications, drawings and abstracts are incorporated herein by reference in its entirety.

BACKGROUND OF THE INVENTION

1. Field of the Invention

The present invention relates generally to a vibration damping actuator for use as an active vibration damping apparatus and to an active vibration damping apparatus employing the same, and particularly to a vibration damping actuator suitable for use in a vibration damping apparatus such as an automobile engine mount, body mount, damper, or the like, and to an active vibration damping apparatus employing the same.

2. Description of the Related Art

In order to reduce vibration in an automobile body or other component that is very expected to be vibration-damped, there have been employed vibration damping devices that typically utilize vibration attenuating means, such as a shock absorber or rubber elastic body, or alternatively vibration isolating means that utilize the spring action of a coil spring, rubber elastic body, or the like. However, all of these vibration damping devices exhibit only passive damping action, resulting in the problem of an inability to exhibit adequate damping action in instances where, for example, the vibration to be damped has a characteristics such as frequency, that varies; or in cases where advanced vibration damping is required. Accordingly, in recent years, there have been developed and researched a number of active vibration damping devices that actively and in an offsetting manner reduce vibration to be damped, by means of exerting oscillating force on the component to be damped or the vibration damping device. Examples include those disclosed in Citations 1 and 2 listed hereinbelow.

In such active vibration damping devices, an actuator is needed in order to generate oscillating force, and the actuator needs to have highly controllable frequency and phase as regards the oscillating force generated thereby. A vibration damping actuator appropriate for use in an active vibration damping device may employ a coil, controlling electromagnetic force or magnetic force generated by means of controlling current flow to the coil. In order to actuate vibration of an output member in a high frequency range of several tens of Hz or greater, it is appropriate to employ a guide mechanism for guiding the output member in the actuation direction.

More specifically, as taught inter alia in Citations 1 and 2, a suitable design for such a vibration damping actuator typically has a guide hole extending on the center axis of a cup-shaped housing; an output member disposed spaced apart from the opening end of the housing, with the output member connected to the housing by an elastic connecting rubber part, and a guide rod disposed on the output member inserted into a guide hole; a coil member provided to either the housing or the output member; and an armature including a ferromagnetic body and/or permanent magnet disposed on the remaining housing or output member. By supplying electrical current through, the coil, oscillating force is exerted on the output member by the armature, causing the output member to undergo oscillating displacement in the center axial direction of the housing, on the basis of the guiding action of the guide rod by the guide hole.

In a vibration damping actuator of structure like that described above, for reasons having to do with the actuator assembly process or workability when making various adjustments of the actuator, the guide hole which is bored in the housing in order to guide the guide rod often has the structure of being bored through the housing and opening out onto the bottom face of the housing.

However, a problem is that when left with the guide hole open at the bottom face of the housing, foreign matter such as dirt, dust or water entering through the opening can infiltrate into the guided portion of the guide rod that is guided by the guide hole, hindering displacement of the armature and, consequently, of the output member, so that the output member does not consistently exhibit the desired actuating force.

To cope with this problem, it would be possible, as taught for example in Citation 3, to form a thread groove in the open area of the guide hole in the housing, and to screw a screw cap thereon to cover it. However, since it is the function of the actuator to generate vibration, where the guide hole is simply covered by a screw cap, there is an unavoidable risk of the screw cap loosening and coming off due to vibration. Additionally, with a simple screw cap tightening structure, it is not always an easy matter to ensure a consistently adequate level of sealing against water or the like.

Further, a screw cap naturally requires an operation to screw it in when attaching it, and since the screwing operation requires both considerable time and a tedious procedure, such a structure is needlessly laborious, and also creates the problem of an extremely laborious and time-consuming procedure to remove the screw cap during maintenance, for example. While it would be conceivable to install an O-ring in the threaded section of the screw cap in order to improve sealing, installation of an O-ring makes the structure even more complicated, and unavoidable results in an even more laborious screw cap assembly operation, and as such does not represent an effective solution.

As shown in FIG. 3 appearing in Citation 4, it would be possible to cover the guide hole by using several fastening bolts to affix a plate onto the opening of the guide hole in the housing. However, the process of threading several fastening bolts requires additional time and labor, and is not necessarily an effective method. Alternatively, it would be possible to weld the plate onto the opening of the guide hole in the housing, but since welding precludes subsequent removal, this creates the problem of being unable to subsequently perform adjustment or maintenance through the guide hole, and is not practical for this reason.

[Citation 1]
JP-A-9-89040
[Citation 2]
JP-A-10-231886
[Citation 3]
JP-A-2001-1765
[Citation 4]
JP-A-9-49541 (FIG. 3)

SUMMARY OF THE INVENTION

It is therefore one object of this invention to provide a vibration damping actuator of novel design, wherein a housing bottom opening of a guide hole that guides a guide rod of an output member whose oscillation is actuated by current through a coil, can be covered in fluid tight fashion by means of a simple structure and an easy procedure.

It is another object of the invention to provide an active vibration damping mount and an active vibration damper, as active vibration damping devices having novel structures.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the invention relates to an active damping actuator. A first mode of the first aspect of the invention is a vibration damping actuator comprising: a cup-shaped housing; a guide hole disposed extending through the housing on the center axis thereof; an output member disposed spaced apart from an opening end of the housing; an elastic connecting member elastically connecting the output member to the housing; a guide rod disposed on the output member and positioned inserted into the guide hole; a coil member provided to one of the housing and the output member; an armature including a ferromagnetic body and/or a permanent magnet disposed on an other of the housing and the output member, the armature being adapted to exert actuating force on the output member by means of application of electric current to the coil member, causing the output member to undergo oscillating displacement in a center axial direction of the housing, on the basis of guiding action for the guide rod by the guide hole; a guide hole open onto a bottom face of the housing; an annular shoulder portion formed to an inside of an opening of the guide hole; a lid metal plate fitted into the opening of the guide hole with a size enough to prevent inward displacement thereof into the guide hole by the annular shoulder portion; an engaging groove disposed on an inner circumferential surface of the opening; a snap ring of C-letter shape fitted into the engaging groove to prevent the lid metal plate from becoming dislodged from the opening; and a sealing rubber layer bonded on and coating an inside face of the lid metal plate, wherein the lid metal plate is pressed by the snap ring of C-letter shape and the sealing rubber layer is pushed against the annular shoulder portion, thereby sealing the opening of the guide hole.

In a vibration damping actuator of construction according to this mode, the lid metal plate is installed in the housing, while in a state of being pushed inwardly by the snap ring of C-letter shape in opposition to elasticity of the sealing rubber layer, which is bonded on while coating the inside face of the lid metal plate by means of integral vulcanization molding or the like. Accordingly, the sealing rubber layer is compressed by and between the lid metal plate and the annular shoulder portion formed at the opening of the guide portion in the housing, so as to provide a fluid tight sealing to the opening of the guide hole.

Since the sealing rubber layer is kept clamped against the annular shoulder portion by the lid metal plate by the snap ring of C-letter shape installed engaged within the guide hole opening, the sealing rubber layer can be maintained in a consistent claimed state without the elasticity of the sealing rubber layer acting in a direction that would dislodge the snap ring of C-letter shape, a sealed state can be maintained consistently for an indefinite period, even when exposed to repeated actuating force, such as oscillating force.

The snap ring of C-letter shape can be installed engaged in the engaging groove by simply by constricting its diameter and snapping it into place in the opening in known art manner, thereby obviating the need for the laborious screwing operation required with screw caps of conventional design, so that a high level of sealing may be achieved by means of a fast and easy assembly process.

Additionally, since the sealing rubber layer is directly bonded on and coats the inside face of the lid metal plate, there is no need to install a separate O-ring or other such sealing material. Also, there is no risk of dislodging of the sealing rubber layer from the seal area. Namely, the use of such a sealing rubber layer makes it fairly easy to achieve the desired level of sealing on a more consistent basis.

A second mode of the first aspect of the invention is a vibration damping actuator according to the above-described first mode, wherein the armature is provided as a separate structure from the output member, and is adjustable in position relative to the output member in the axial direction of the guide hole, and wherein position adjustment operation of the armature relative to the output member is performed through the opening of the guide hole which opens onto the bottom face of the housing. In this mode, the guide hole opening can be utilized positively in order to perform actuator output adjustments, attachment, or other operations, for example, while at the same time enabling to provide an easy and excellent sealing to the opening. This makes it possible to employ without any problem such an opening that utilizes the guide hole, even in cases where conventional structures are problematic owing to problems with sealing or the like.

A third mode of the first aspect of the invention is a vibration damping actuator according to the above-described first or second mode, further comprising a rubber layer bonded on and coating substantially entirely the inside face of the lid metal plate, wherein the sealing rubber layer is formed by utilizing an outer peripheral portion of the rubber layer, and a rubber buffer layer positioned in opposition to an distal end portion of the guide rod is formed by a center portion of the rubber layer so that the distal end portion of the guide rod comes into cushioned abutment with the lid metal plate via the rubber buffer layer in order to provide a stop mechanism for cushionwise limiting of an amount of displacement of the output member. This mode makes it possible to realize a stop mechanism for cushionwise limiting of excessive displacement of the output member, by means of a simple structure and small number of components. Additionally, the rubber buffer layer which serves as the cushioning elastic element is integrally formed with the sealing rubber layer, needing no additional manufacturing step or attachment step when producing the stop mechanism, resulting in no problem of increased costs.

Meanwhile, active vibration damping actuators as disclosed in the above listed Citations 1 and 3, for example, is desired to be able to control, with a high degree of accuracy, the relative position of the armature with respect to the coil so that oscillating force can be exerted effectively on the armature through application of current to the coil member.

To meet this end, it would be conceivable, for example, to provide a through hole in the armature, and pass the guide rod through the through hole, while disposing a coil spring between the opposed faces of the armature and output member, as well as threading a fastening nut onto the distal end portion of the guide rod passed through the armature, and compressing the coil spring by a predetermined amount via the armature, whereby the output member is connected in a position-adjustable manner in the axial direction (displacement direction) relative to the armature.

Where such a connecting structure is employed, it becomes possible to adjust relative position of the armature with respect to the coil member, simply by modifying the extent of tightening of the fastening nut, thereby enabling suitable adjustment of the size of the air gap exerting magnetic force or electromagnetic force on the armature by means of application of current to the coil member. This reduces instability of output characteristics which can result from dimensional error of components or the like, so that consistent output characteristics can be achieved efficiently.

However, extent research conducted by the inventors has shown that in a vibration damping actuator having a design like that described above, namely, with a coil spring disposed between the opposed faces of the armature and the output member, there is a risk that, under certain operating conditions, output characteristics may decline or fluctuate relatively early on, making it difficult to consistently achieve satisfactory durability as regards operating characteristics.

In view of the above, a fourth mode of the first aspect of the invention has been developed to provide a novel vibration damping actuator which has the output member equipped with the guide rod, fastened and connected via a coil spring to the armature on which oscillating force is exerted by application of current to a coil member, wherein the vibration damping actuator has improved construction so as to afford improved durability, and exhibiting more consistently effective output characteristics over extended periods.

The fourth mode of the first aspect of the invention is a vibration damping actuator according to any one of the above-described first through third modes, wherein the guide rod extending toward the armature is provided to the output member, a through hole is provided to the armature, the guide rod is passed through the through hole, and a coil spring is fitted onto an outside of the guide rod between opposed faces of the armature and the output member, while threading a fastening nut onto the distal end portion of the guide rod extending through the armature, to compress the coil spring by a predetermined amount via the armature so that the output member is connected positioned in an axial or the displacement direction of the guide rod relative to the armature, while a first spring seat is disposed on a projecting portion of the guide rod of the output member, with the first spring seat interposed between the output member and an axial end of the coil spring, and between an inner circumferential surface of the axial end of the coil spring and an outer circumferential surface at a basal end of the guide rod.

As a result of extensive testing and research in view of the aforementioned problems, the inventors discovered that a technical reason for why it is difficult to consistently assure enduring operating characteristics in a vibration damping actuator of construction wherein, as described above, an output member equipped with a guide rod is fastened and connected via a coil spring to an armature, may stem from tiny particles of dust produced during operation.

Specifically, the output member, which is abutted by the coil spring, has a support rubber elastic body vulcanization bonded thereto. However, even where the face abutting the coil spring is not covered by the support rubber elastic body, so that the coil spring comes into abutment directly with the output member, it is nevertheless typical for the entire face of the output member (including the coil spring-abutting area) to be coated with adhesive for vulcanization molding. In some instances, the surface of the output member may be coated by an extremely thin rubber layer resulting from rubber material entering areas of close contact between a mold and the output member during molding of the support rubber elastic body. Thus, it is a fact in many instances that an adhesive or rubber layer layer several tens of $\mu$m in thickness is present on the output member face abutted by the coil spring. Where such an extremely thin layer having a thickness that could be ignored in an ordinary mechanical apparatus is present on the coil spring abutting face of the output member, the thin layer is reduced to tiny particles of dust and becomes delaminated through repeated impact with the coil spring end by the output member oscillated through application of current through the coil member. This dust then becomes scattered throughout the housing. Particularly, a wire wound end edge is present at the end of the coil spring, whereby slight displacement of the end edge is produced during repeated compressive deformation of the coil spring. As a result, the layer adhesive or rubber layer present on the output member is actively abraded away and thus easily delaminated.

In another actuator constructed so that oscillation force is actuated by means of magnetic force or electromagnetic force exerted on the armature through application of current through the coil member, it is common practice, in order to suppress twisting deformation of moveable parts, including the armature and guide rod to achieve consistent axial displacement, to form a guide face having extremely slight clearance in the axis-perpendicular direction between the moving portion on the armature side and the stationary portion on the coil member side. While tiny particles of dust on the order of several tens of $\mu$m, would not pose a problem in an ordinary mechanical apparatus as described above, if they are produced within the housing and become lodged in a slight clearance formed between the moving portion on the armature side and the stationary portion on the coil member side, these tiny particles of dust cause considerable hindering operation of moving parts, and cause instability or marked degradation of output characteristics.

In the fourth mode of the first aspect of the invention, which was perfected as a result of further investigation carried out on the basis of such novel discoveries, the coil spring abuts the output member via the first spring seat which is formed as a separate member from the output member, so that even if an adhesive layer or rubber layer covers the output member, it is nevertheless possible to prevent scraping of the adhesive layer or rubber layer resulting from abrasion by the end edge of the coil spring, for example. Accordingly, there can now be advantageously achieved a vibration damping actuator whereby creation of dust inside the housing in association with oscillation of the output member is suppressed, misoperation attributed to such dust is avoided, and enduring desired output characteristics are achieved consistently.

The first spring seat employed in this mode is formed as a separate member from the output member that has the support rubber elastic body vulcanization bonded thereto, and is attached to the output member only after vulcanization molding of the support rubber elastic body. However, if needed, it may be subsequently fixed to the output member by means of adhesive or the like. The material for fabricating the first spring seat may be any material having high strength and durability to withstand abrasion by the coil spring, as well as ample load resistance. Stainless steel or similar metallic materials are especially suitable for use. The coil spring employed in this element will preferably be arranged with the axial end thereof arranged positioned in stable abutment against the output member over as long an area as possible in the circumferential direction, so as to avoid bias in the elastic force exerted on the output member. In this sense, a coil spring of whose end portion structure is of closed end type, or a coil spring of construction that, even if of open end type, has been ground or tapered so as to overlie the output member over an area just short of the entire circumference.

A fifth mode of the first aspect of the invention is a vibration damping actuator according to the above-described fourth mode, wherein an outside diameter of the guide rod varies in an axial direction thereof, having large diameter at a basal end thereof, and the first spring seat fits externally onto the basal end of the guide rod. In this mode, axis-perpendicular displacement of the coil spring with respect to the first spring seat can be limited by disposing the first spring seat in abutment with the basal end of the guide rod. By giving a small diameter to the projecting portion of the guide rod, apart from the basal end thereof, interference of the coil spring with the guide rod can be avoided. As a result, it is possible to exert a more consistent level of elastic force of the coil spring on the output member, and to provide more stable operation of the output member.

A sixth mode of the first aspect of the invention is a vibration damping actuator according to the above-described fourth or fifth modes, wherein an inner circumferential surface of an axial end portion of the coil spring fits externally onto the first spring seat. In this mode, positioning of the coil spring in the axis-perpendicular direction with respect to the first spring seat is achieved. Accordingly, the first spring seat and coil spring assembly locations to the output member may be consistently maintained, so that a more consistent level of elastic force of the coil spring may be exerted on the output member. Preferably, this mode will be used in conjunction with the mode fifth hereinabove, thereby making it possible to effectively position both the first spring seat and coil spring with respect to the output member. External fit of the first spring seat onto the inner rod in the fifth mode, and external fit of the coil spring onto the first spring seat in this sixth mode are both preferably designed so that contact takes place around the entire circumference in the circumferential direction, so as to substantially prevent the occurrence of chatter.

A seventh mode of the first aspect of the invention is a vibration damping actuator according to any one of the above-described fourth through sixth modes, wherein an outside peripheral edge of the first spring seat is raised in an axial direction thereof towards the coil spring so that the first spring seat has an annular, generally recessed groove shape overall. In this mode, by raising the outside peripheral edge of the first spring seat, the outside peripheral edge of the first spring seat can be made to form an edge shape, thus avoiding production of dust due to abrasion of the output member. Raised portions at the two peripheral walls, i.e. the inner and outer walls of the first spring seat may preferably be formed with curving faces, so that an outer peripheral faces form no acute angle edge and do not catch on the output member or grind down the output member.

A eighth mode of the first aspect of the invention is a vibration damping actuator according to any one of the above-described fourth through seventh modes, wherein a second spring seat is disposed on an coil spring abutting area of the armature, with the second spring seat interposed between the coil spring and the armature. In this mode, since the coil spring abutting area of the armature is also protected by the second spring seat, regardless of the material of the armature, production of dust due to abrasion by the coil spring on the armature side may be avoided.

A ninth mode of the first aspect of the invention is a vibration damping actuator according to any one of the above-described fourth through eighth modes, wherein the support rubber elastic body is bonded by vulcanization to an outside peripheral portion of the output member, while an inner peripheral portion of the output member abutted by the coil spring is substantially devoid of covering by the support rubber elastic body, and the first spring seat is positioned directly onto a surface of the output member. That is, according to the above described modes 4–8, despite a rubber layer being formed covering the coil spring abutting face of the output member, production of dust is suppressed by interposing the first spring seat, so as to not become a significant problem. Whereas, in this mode, the first spring seat is positioned substantially directly on the output member, whereby abutment of the first spring seat against the output member may be stabilized, so that operating characteristics of the output member are more consistent, as well as avoiding problems such as collapse of the rubber material, since substantially no rubber material is interposed on the transmission path of elasticity from the coil spring to the output member.

A second aspect of the invention relates to an active vibration damping mount. A first mode of the second aspect of the invention is an active vibration damping mount comprising: a first mounting member fixable to one of two members that are mutually connected to make up a vibration transmission system; a second mounting member fixable to an other one of the two members; a rubber elastic body connecting the first and second mounting members and partially defining a pressure receiving chamber which has a non-compressible fluid sealed therein; an oscillating member partially defining the pressure receiving chamber; and an actuator for exerting oscillation force on the oscillating member so that oscillation of the oscillating member is actuated by means of the actuator in order to control pressure in the pressure receiving chamber, wherein the actuator comprises a vibration damping actuator according to any one of claims 1–9, and the housing of the vibration damping actuator is fixed to the second mounting member, while the oscillating member constituted by means of the output member of the vibration damping actuator. According to this aspect of the present invention, it is possible to achieve a fluid-filled vibration damping mount that consistently achieves the desired active vibration damping performance over extended periods, effectively realizing an active vibration damping mount suitable for use as an automobile engine mount, for example.

In the active vibration damping mount herein, there is employed, as taught in Citation 5, a fluid-filled vibration damping device wherein a first mounting member fixed to one of the two members connected in vibration damping fashion, and a second mounting member fixed to an other one of the two members are elastically connected by means of a rubber elastic body; a pressure receiving chamber formed to one side of the rubber elastic body and an equilibrium chamber formed to the other side communicate through an orifice passage; and a non-compressible fluid is sealed within the pressure receiving chamber and the equilibrium chamber, whereby during vibration input, damping action is produced on the basis of resonance or flow action of the fluid forced to flow through the orifice passage between the pressure receiving chamber and the equilibrium chamber. With the fluid filled vibration damping device of such construction, the height dimension of the vibration damping apparatus overall can be reduced by forming the pressure receiving chamber and the equilibrium chamber to either side of the rubber elastic body, making it advantageous for use where installation space is limited, as with an engine mount for an automotive vehicle.

[Citation 5]

JP-A-2001-59540

With an active vibration damping mount, e.g. an engine mount, employing such a fluid-filled vibration damping device, when excessive vibrational load is input, such as when cranking while the vehicle is stopped or when driving over the step, in order to limit relative displacement of the power unit relative to the body, it is typical to employ a stop mechanism that provides limitation of elastic deformation by the rubber elastic body and cushionwise limitation of relative displacement of the first mounting member and second mounting member. Such a stop mechanism may be realized, for example, by projecting a cushioning stop rubber integrally molded with the rubber elastic body on the faces opposed to the first mounting member and the second mounting member.

However, in the fluid-filled vibration damping device of the above-described construction having the pressure receiving chamber and equilibrium chamber formed to either side of the rubber elastic body, a problem in terms of producing the stop mechanism is the difficulty of integrally molding a stop rubber with the rubber elastic body.

Covering the rubber elastic body from the outside with a flexible rubber layer and integrally molding the rubber elastic body and the flexible rubber layer, as is taught in Citation 5 mentioned hereinabove, is difficult for reasons pertaining to mold construction, and it is structurally difficult to integrally mold a stop rubber extending outwardly from the rubber elastic body. While it would be conceivable to integrally mold the stop rubber by means of the flexible rubber layer disposed on the outside, the characteristics required of the flexible rubber layer, which basically has no load input, differ greatly from the characteristics required of the stop rubber, and thus where the stop rubber is integrally formed with the flexible rubber layer, in a material sense, it will be difficult to endow the stop rubber with the characteristics required of it.

Thus, a second mode of the second aspect of the invention relating to an active vibration damping mount has as an object to provide an active vibration damping mount of novel construction, wherein a stop mechanism for limiting relative displacement of the first mounting member and the second mounting member may be effectively realized by means of a simple structure, while adequately meeting the characteristics required of it, such as load strength, and without requiring any special processing steps such as welding.

The second mode of the second aspect of the invention is an active vibration damping mount according to the above-described first mode, further comprising: an elastic body central member bonded to a center portion of the rubber elastic body; an elastic body outer member bonded to an outer peripheral portion of the rubber elastic body; a rubber-layer central member bonded to a center of a flexible rubber layer disposed so as to cover an exterior of the rubber elastic body; and a rubber layer outer member bonded to an outer peripheral portion of the flexible rubber layer, wherein the elastic body central member and the rubber-layer central member are fixed to each other to constitute the first mounting member, while the elastic body outer member and the rubber layer outer member are fixed to each other to constitute the second mounting member, an equilibrium chamber having non-compressible fluid sealed therein and partially defined by the flexible rubber layer is formed on an opposite side of the rubber elastic body from the pressure receiving chamber, and an orifice passage is formed for permitting fluid communication between the pressure receiving chamber and the equilibrium chamber, wherein an annular support portion is formed by extending the rubber layer outer member to an outer peripheral side thereof, a rebound stop member of gate shape extending across an outside of the first mounting member is laminated and bonded at both basal ends thereof onto the annular support portion by means of a fastening member, wherein a rebound stop rubber is bonded to a face of the rebound stop member opposed to the first mounting member, thereby constituting a rebound stop mechanism for cushionwise limitation of an extent of elastic deformation of the rubber elastic body in the rebound direction, by means of direct abutment of the first mounting member against the rebound stop rubber, and wherein a bound stop member is superimpose on the annular support portion, and is fastened sandwiched between at least one basal end portion of the rebound stop member and the annular support portion, by means of the fastening member, while a bound stop rubber is bonded to the surface of the bound stop member to thereby constitute a bound stop mechanism for cushionwise limitation of an extent of elastic deformation of the rubber elastic body in a bound direction, by means of direct or indirect abutment of the first mounting member against the bound stop rubber.

In an active vibration damping mount of construction according to this mode, the rebound stop member and the bound stop member that are respectively separate elements from the first and second mounting members are employed. Further, the rebound stop rubber and bound stop rubber that are respectively separate elements for the rubber elastic body and flexible rubber layer are formed bonded to this rebound stop member and bound stop member. Here, the bound stop member in particular is not simply disposed overlapping the annular support portion provided to the rubber layer outer member, but is sandwiched between the rebound stop member and the annular support portion and, while pinched thereby over a sufficiently large area between the two fittings, is fastened with a bolt to affix it to the annular support portion. Therefore, it is possible to achieve effective reinforcing action of the bound stop member, in order to easily realize a high strength stop mechanism.

That means in short that in the rubber layer outer member, during action of the stop mechanism, a heavy load is exerted on the fixing locations of the rebound stop member and bound stop member. However, in this mode, the fixing locations of the rebound stop member and bound stop member in the rubber layer outer member are of common construction, whereby strength in the fixing locations is significantly improved by means of the rebound stop member and bound stop member positioned on the rubber layer outer member. Thus, the rebound stop mechanism and the bound stop mechanism with ample strength can be realized with a simple construction, without the need for a special reinforcing structure such as a thicker member etc.

Additionally, material design of the rebound stop rubber and the bound stop rubber, which are formed as separate elements from the rubber elastic body and flexible rubber layer, need not be constrained by the characteristics required of the rubber elastic body and flexible rubber layer, so that better stop function may be realized easily.

Further, as the rebound stop member and the bound stop member are fixed by a common fastening member, e.g. a bolt, advantages such as simpler construction, fewer number of parts, and easier assembly may be effectively achieved.

A third mode of the second aspect of the invention is an active vibration damping mount according to the above-described second mode, further comprising a temporary fixing member for temporarily fixing the bound stop member to the annular support portion, in an absence of fixing force by the fastening bolt. In this mode, once the bound stop member has been assembled with the rubber layer outer member, it is possible to prevent the bound stop member from coming off the rubber layer outer member before the rebound stop member has been fastened on with the fastening bolt, or before the fastening bolt has been completely tightened. By providing appropriate temporary fixing member, the bound stop member can be prevented from slipping out of position with respect to the rubber layer outer member.

A fourth mode of the second aspect of the invention is an active vibration damping mount according to any one of the above-described second or third mode, wherein the bound stop member is formed to have a length equal to or greater than a half of a circumference of the annular support portion, and the bound stop member is fixed to the annular support portion by means of the fastening members fixing both basal end portions of the rebound stop member. In this mode, naturally, fixing force of the bound stop member to the rubber layer outer member is increased. Additionally, it is more advantageously exhibited reinforcing action of bolt fixing locations at both sides of the rebound stop member in the annular support portion of the rubber layer outer member, affording additional improvement in withstand strength of the rebound stop mechanism as well, rather than just the bound stop mechanism.

A fifth mode of the second aspect of the invention is an active vibration damping mount according to any one of the above-described second through fourth modes, wherein the rubber layer outer member has a generally cylindrical shape, and is externally fitted onto the elastic body outer member, and the orifice passage is formed so as to extend in a circumferential direction between the elastic body outer member and the rubber layer outer member, while the annular support portion is integrally formed at one axial opening of the rubber layer outer member, and a closure member is superimposed onto an other axial opening, and caulked at an outside peripheral edge thereof, together with an outside peripheral edge of the elastic body outer member, to the other opening of the rubber layer outer member so as to close the opening of the elastic body outer member in fluid-tight fashion.

In this element, the elastic body outer member and the rubber layer outer member are skillfully utilized to form the orifice passage of adequate passage length, with good space efficiency. Additionally, the axial opening on the opposite side of the rubber layer outer member from the elastic body-side outer member can be reliably sealed in fluid-tight fashion by means of caulking the closure member thereon. In particular, where the closure member is attached to the rubber layer outer member while immersed in a mass of a non-compressible fluid, non-compressible fluid can be readily sealed within the fluid chambers (the pressure receiving chamber and equilibrium chamber) at the same time when these are formed.

A third aspect of the invention relates to an active vibration damper adapted to be installed on a member whose vibration to be damped, in order to exert oscillating force on the member for producing active vibration damping action, comprising: a vibration damping actuator constructed according to any one of the above-described mode 1–9; a mount portion for fixation to the vibration-damper member disposed in one of the housing and the output member in the vibration damping actuator; and a mass portion disposed on an other of the housing and the output. According to this aspect of the invention, it is possible to realize the active vibration damper that exhibits desired active damping performance consistently for an extended period, thereby advantageously affording an active vibration damper suitable for use as an automobile body damper, for example.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
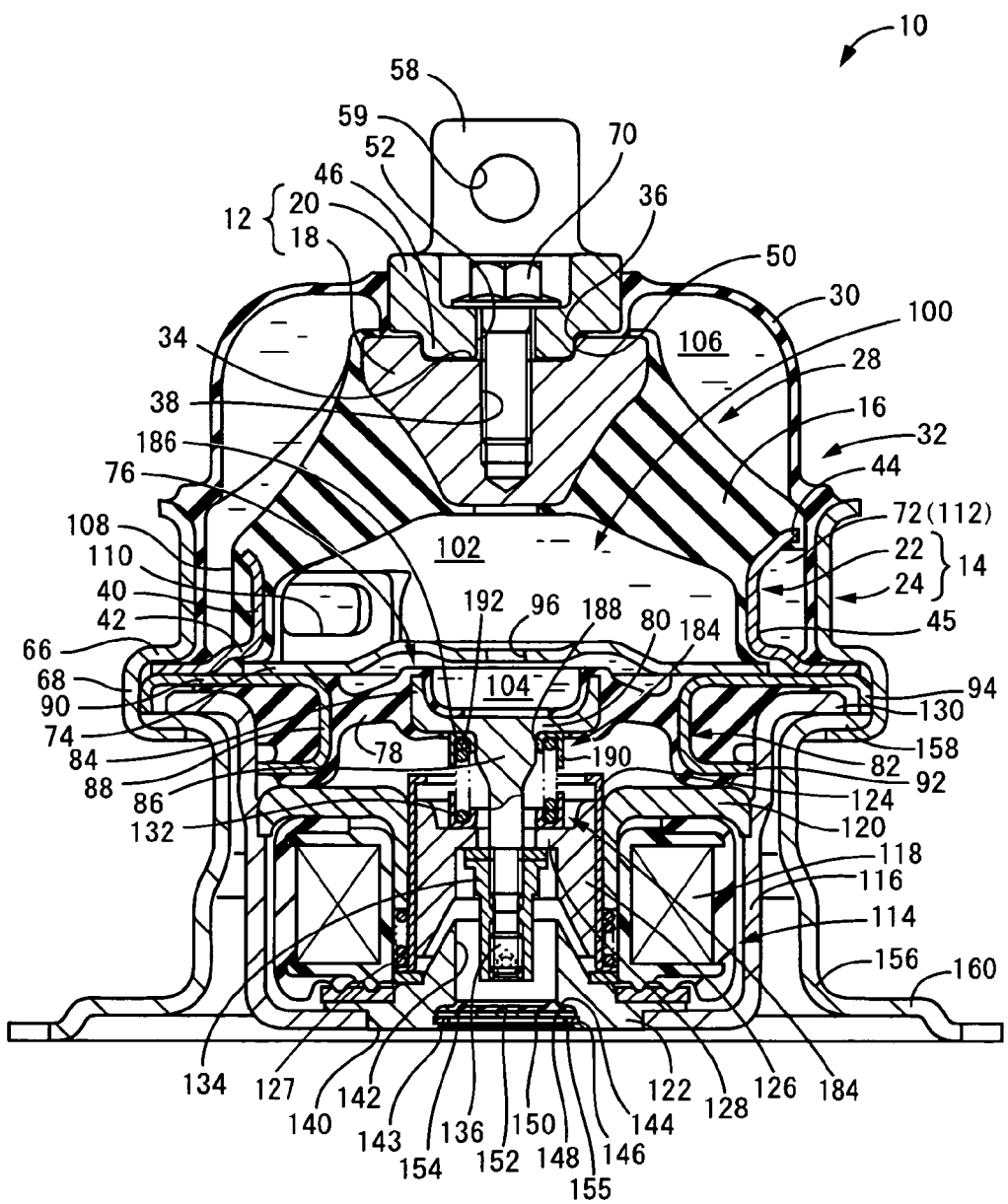
FIG. 1 is an elevational view in axial or vertical cross section of an active vibration damping mount in the form of an automotive engine mount constructed according to a first embodiment of the invention.

Referring first to FIG. 1, shown is an active vibration damping mount in the form of an engine mount 10 constructed according to a first embodiment of the present invention. The engine mount 10 includes a first mounting member 12 and a second mounting member 14 which are both made of metal, and are elastically connected to each other via a rubber elastic body 16 interposed therebetween. With the first mounting member 12 fixed to a power unit (not shown) of the vehicle, and the second mounting member 14 fixed to a body (not shown) of the vehicle, the engine mount 10 can support the power unit on the body of the vehicle in a vibration damping fashion. With the engine mount 10 installed in position as described above, an initial load or weight of the power unit as well as a vibrational load to be damped are primarily applied between the first and second mounting members 12, 14 in an approximately axial direction of the engine mount 10, i.e., the vertical direction as seen in FIG. 1. In the following description, the vertical direction is basically equal to the vertical direction as seen in FIG. 1.

The first mounting member 12 includes an elastic-body-side inner member 18 functioning as an elastic body central member and a diaphragm-side inner member 20 functioning as a rubber-layer central member. On the other head, the second mounting member 14 includes an elastic-body-side outer sleeve member 22 functioning as an elastic body outer member and a diaphragm-side outer sleeve member 24 functioning as a rubber layer outer member. The elastic-body-side inner member 18 and the elastic-body-side outer sleeve member 22 are bonded to the elastic body 16 by an integral vulcanization molding of a rubber material with the two members 18, 22, thereby providing a first integral vulcanization product 28. Likewise, the diaphragm-side inner member 20 and the diaphragm-side outer sleeve member 24 are bonded to a flexible diaphragm 30 functioning as a flexible rubber layer by integral vulcanization molding of a rubber material with the two members 20, 24, thereby providing a second integral vulcanization product 32. These first and second integral vulcanization products 28,32 are mutually assembled.

Described in detail, the elastic-body-side inner member 18 of the first integral vulcanization product 28 has an approximately inverted truncated conical shape in its entirety. An upper end face (large diameter end face) of the elastic-body-side inner member 18 has a fitting recess 34 open therein. As is apparent from FIGS. 1–3, the fitting recess 34 has a chord shaped portion at a circumferential position thereof to provide an engaging inner circumferential surface 36.

The elastic-body-side inner member 18 is further formed with a tapped hole 38 open in a bottom face of the fitting recess 34. A center axis of the tapped hole 38 is off-centered by a predetermined distance from the center of the fitting recess 34, thereby extending parallel to a center axis of the elastic-body-side inner member 18. Preferably, the elastic-body-side inner member 18 is formed of an aluminum alloy, which is lighter than steel or the like, and easy to mold.

The elastic-body-side outer sleeve member 22 includes a cylindrical wall portion 40 of substantially large-diameter cylindrical configuration, and a flange portion 42 integrally formed at an axially lower end portion of the cylindrical wall portion 40, and extending diametrically outwardly. An axially upper end portion of the cylindrical wall portion 40 provides a tapered cylindrical portion 44 whose diameter gradually increases as its goes axially upward. The elastic-body-side outer sleeve member 22 of this configuration provides a circumferential groove 45 open in an outer circumferential surface thereof and extending circumferentially with a circumferential length slightly smaller than a circumference thereof. The elastic-body-side inner member 18 is disposed upward of and concentrically with the elastic-body-side outer sleeve member 22 with an axial spacing therebetween, such that an outer circumferential surface of tapered configuration of the elastic-body-side inner sleeve member 18 and an inner circumferential surface of the tapered cylindrical portion 44 of the elastic-body-side outer sleeve member 22 are mutually opposed to each other with a spacing therebetween. The elastic body 16 is disposed in between and elastically connecting the outer circumferential surface of the elastic-body-side inner member 18 and the inner circumferential surface of the tapered cylindrical pardon 44.

The elastic body 16 has a large-diameter truncated conical shape in its entirety. In a small diameter or central portion of the elastic body 16, the elastic-body-side inner member 18 is embedded in a coaxial relationship with the elastic body 16, by the aforesaid integral vulcanization molding. In a large diameter portion of the elastic body 16, the tapered cylindrical portion 44 of the elastic-body-side outer sleeve member 22 is bonded to an outer circumferential surface of the elastic body 16 by the aforesaid integral vulcanization molding. Thus, the elastic body 16 is equipped with the elastic-body-side inner member 18 and the elastic-body-side outer sleeve member 22, providing the first integral vulcanization product 28.

The diaphragm-side outer sleeve member 24 has a thin-walled large-diameter cylindrical shape in its entirety, and has a flange portion 66 integrally formed at its axially lower open-end portion extending diametrically outwardly. Integrally formed at an outer peripheral edge of the flange portion 66 is an annular caulking lip 68 projecting axially downward.

The diaphragm-side inner member 20 is disposed upward of and concentrically with the diaphragm-side outer sleeve member 24 with an axial spacing therebetween, and is elastically connected with the diaphragm-side outer sleeve member 24 by the flexible diaphragm 30.

The flexible diaphragm, 30 is a thin rubber layer of approximately annular configuration, and extends circumferentially with a curve cross section as to provide a large slack to permit an easy elastic deformation thereof. An inner peripheral edge of the flexible diaphragm 30 is bonded to an outer peripheral edge of the diaphragm-side inner member 20 by the aforesaid integral vulcanization molding, and an outer peripheral edge of the flexible diaphragm 30 is bonded to the axially upper open end portion of the diaphragm-side outer sleeve member 24 through an integral vulcanization molding. Thus, the flexible diaphragm 30 is equipped with the diaphragm-side inner member 20 and the diaphragm-side outer sleeve member 24, providing the second integral vulcanization product 32.

The second integral vulcanization product 32 is superimposed on and assembled with the first integral vulcanization product 28 such that the diaphragm-side inner member 20 is fixed to the elastic-body-side inner member 18, while the diaphragm-side outer sleeve member 24 is fixed to the elastic-body-side outer sleeve member 22. With the first and second vulcanization products 28, 32 assembled together, the flexible diaphragm 30 is situated outward of the elastic body 16 with a spacing therebetween, while covering an entire outer circumferential surface of the elastic body 16.

Namely, the diaphragm-side inner member 20 is directly superimposed on the upper surface of the elastic-body-side inner member 18 with its fitting projection 46 secured press fit into the fitting recess 34 of the elastic-body-side inner member 18. With this mating state, the diaphragm-side inner member 20 and the elastic-body-side inner member 18 are mutually positioned in a coaxial fashion. In particular, the engaging outer circumferential surface 50 formed on the fitting projection 46 is brought into engagement with the engaging inner circumferential surface 36 of the fitting recess 34, whereby the diaphragm-side inner member 20 and the elastic body-side inner member 18 are mutually positioned in a circumferential direction as well. Thus, the through hole 52 of the diaphragm-side inner member 20 and the tapped hole 38 of the elastic-body-side inner member 18 are in alignment with each other.

With the elastic-body-side inner member 18 and the diaphragm-side inner member 20 assembled with each other as shown in FIG. 1, a connecting bolt 70 is inserted through the through hole 52 and threaded and tightened into the tapped hole 38. By connecting the elastic-body-side inner member 18 and the diaphragm-side inner member 20 together by means of the connecting bolt 70, is provided the first mounting member 12.

On the other hand, the diaphragm-side outer sleeve member 24 is assembled from the axially upper side with the elastic-body-side outer sleeve member 22, so as to be disposed about the elastic-body-side outer sleeve member 22. At the lower side of the elastic-body-side outer sleeve member 22, the flange portion 42 is held in contact at its peripheral portion with the flange portion 66 of the diaphragm-side outer sleeve member 24 in the axial direction. At the upper side, an open peripheral portion of the tapered cylindrical portion 44 is held against an inner circumferential surface of the diaphragm-side outer sleeve member 24 in the diametric direction.

With this mating state, a caulking lip 68 of the diaphragm-side outer sleeve member 24 is caulked against the peripheral portion of the flange portion 42 of the elastic-body-side outer sleeve member 22, whereby the elastic-body-side outer sleeve member 22 and the diaphragm-side outer sleeve member 24 are mutually fastened together. In addition, the upper and lower end of the elastic-body-side outer sleeve member 22 are held against the diaphragm-side outer sleeve member 24 with sealing rubber layers integrally formed with the elastic body 16 or the flexible diaphragm 30 compressed therebetween, respectively, so as to provide a fluid-tight sealing therebetween. With the elastic-body-side outer sleeve member 22 assembled with the diaphragm-side outer sleeve member 24 as described above, the opening of the circumferential groove 45 is fluid-tightly closed by the diaphragm-side outer sleeve member 24. Thus, there is formed an annular fluid passage 72 continuously extending in the circumferential direction between the cylindrical wall portion 40 of the elastic-body-side outer sleeve member 22 and the diaphragm-side outer sleeve member 24, with a given circumferential length, or over an entire circumference of the cylindrical wall portion 40.

On the lower side of the elastic-body-side outer cylindrical member 22, there are disposed a partition metal plate 74 and a closure member 76. The closure member 76 includes a substantially annular support rubber plate 78 and an oscillating plate 80 as an output member bonded to the central portion of the support rubber plate 78, while an annular retaining member 82 is bonded onto the outer peripheral edge of the support rubber plate 78, through a vulcanization molding of the closure member 76. That is, the oscillating plate 80 and the annular retaining member 82 are elastically connected to each other via the support rubber plate 78.

The oscillating plate 80 is a disk shaped member, and has an annular linking portion 84 integrally formed at the outside edge thereof projecting upwardly. A drive shaft 86 is integrally formed extending downwardly at a central portion of the oscillating plate 80, and a thread portion is provided to the proximal end portion of the driving shaft 86. The oscillating plate 80 including the annular linking portion 84 and the drive shaft 86, is made integrally of rigid material such as metal or hard resin. The annular retaining member 82 includes a cylindrical portion 88, and a fixing plate 90 as well as a positioning projection 92, which are integrally formed at upper and lower openings of the cylindrical portion 88 with outward flange configuration. A circular press-fit portion 94 is integrally formed at the outside peripheral portion of the fixing plate 90 so as to project further downwards.

This oscillating plate 80 is arranged substantially concentrically with and spaced apart diametrically inwardly from the annular retaining member 82. The supporting rubber plate 78 is arranged so as to extend between the diametrically opposed faces of the annular retaining member 82 and the oscillating plate 80. The supporting rubber plate 78 is bonded at its inner and outer peripheral portions to the opposing faces of the outer peripheral projection of the oscillating plate 80 and a tubular portion 88 of the annular retaining member 82, through vulcanization process of a rubber material for forming the supporting rubber plate 78. With this arrangement, a gap formed between the oscillating plate 80 and the annular retaining member 82 is fluid tightly closed by means of the supporting rubber plate 78. That is, the support rubber plate 78 can be formed through vulcanization molding in which a rubber material for forming the support rubber plate 78 is provided to fill a mold cavity of a mold in which are preset the oscillating plate 80 and the annular retaining member 78, which are provided with an adhesive layer or other adhesive treatment in advance, and then undergoes vulcanization, whereby the support rubber plate 78 is formed as an integral vulcanization molded article comprising the oscillating plate 80 and the annular retaining member 82.

The partition metal plate 74 is a thin disk metallic member having an outside diameter of size extending as far as the diametric medial portion of the fixing plate 90 of the annular retaining member 82. The center portion of the partition metal plate 74 projects upward in a generally plateau-like configuration, and is perforated through its thickness on its center axis by an orifice passage 96.

The partition metal plate 74 is assembled in the lower opening of the diaphragm-side outer sleeve member 24, with its outside peripheral portion superimposed against and assembled with the flange portion 42 of the elastic-body-side outer sleeve member 22 assembled therewith. Additionally, the closure member 76 is assembled in the lower opening of the diaphragm-side outer sleeve member 24 from below the partition metal plate 74, and the fixing plate 90 of the annular retaining member 82 in the closure member 76 is superimposed onto the elastic-body-side outer sleeve member 22 and the partition metal plate 74. The thus arranged partition metal plate 74 and the closure member 76 are fixed caulkwise at their outside peripheral portions to the diaphragm-side outer sleeve member 24 by pressingly bending the cylindrical caulking lip 68 of the diaphragm-side outer sleeve member 24 against the outside peripheral portions in the process of caulking fixation.

With the arrangement as discussed above, the opening at the lower end of the diaphragm-side outer sleeve member 24 is closed in a fluid-tight fashion by the closure member 76, whereby a pressure-receiving chamber 100 having a non-compressible fluid sealed therein is formed between the rubber elastic body 16 and the closure member 76. Namely, the pressure receiving chamber 100 is partially defined by the rubber elastic body 16, and is designed to excite fluid pressure variation based on elastic deformation of the rubber elastic body 16 when vibration is input across the first mounting member 12 and second mounting member 14.

The partition metal plate 73 is disposed within the pressure-receiving chamber 100, thereby partitioning the pressure receiving chamber 100 into a vibration receiving chamber 102 on the side of the rubber elastic body 16, and an oscillating chamber 104 on the side of the closure member 76. The vibration receiving chamber 102 and the oscillating chamber 104 are held in fluid communication with each other through the orifice passage 96.

The rubber elastic body 16 and the diaphragm 30 are each directly bonded or attached at their inside peripheral portion and outside peripheral portion to the first mounting member 12 and the second mounting member 14, thereby forming an equilibrium chamber 106 having a non-compressible fluid sealed therein, between the opposing faces of the rubber elastic body 16 and the diaphragm 30. This equilibrium chamber 106 is partially defined by the readily deformable diaphragm 30, and is designed to readily allow change in volume, based on elastic deformation of the diaphragm 30. As the non-compressible fluid sealed within the pressure-receiving chamber 100 and the equilibrium chamber 106, it is typically favorable to employ a fluid having a low viscosity of not larger than 0.1 Pa. s, for example, in order to efficiently achieve effective damping action required in the automobile engine mount 10 based on resonance of fluid flowing through an orifice passage 112, which will be described later.

The aforesaid annular fluid passage 72 formed within the second mounting member 14, is connected at its opposite ends to the pressure receiving chamber 100 on the lower side of the elastic body 16 and equilibrium chamber 106 on the upper side of the elastic body 16 through communication holes 108, 110, thereby providing an orifice passage 112 with a given length which permits a fluid communication between the pressure receiving chamber 100 and the equilibrium chamber 106. As well known in the art, the fluid is forced to flow through the orifice passage 112 on the basis of relative fluid pressure variation caused between the pressure receiving chamber 100 and the equilibrium chamber 106 during input of vibrational load. Thus, the engine mount 10 can exhibit excellent damping effect with respect to the input vibrational load on the basis of resonance of the fluid flowing through the orifice passage 112. The damping performance of the engine mount 10 on the basis of the flows of the fluid through the orifice passage 112 can be adjusted in terms of a frequency characteristic, by only tuning a ratio of the cross sectional area to the length of the orifice passage 112, e.g., can be tuned to engine idling vibration.

On the side of the closure member 76 opposite the pressure-receiving chamber 100, an electromagnetic oscillator 114 is installed as an actuator. This electromagnetic oscillator 114 has a coil 118 fixedly attached while accommodated within a generally cup-shaped housing 116, and yokes 120, 122 of annular ferromagnetic material fixedly attached about the circumference of the coil 118, to form a magnetic path. On the cylindrical inner peripheral wall of the yoke 120 forming the magnetic path, a guide sleeve 124 is elastically positioned and mounted, and a sliding member 126 fabricated of ferromagnetic material and serving as an armature, is slidably disposed inside the guide sleeve 124. The guide sleeve 124 has a thin-walled cylindrical shape, and is retained positioned with respect to the yoke 120 via a retaining coil spring 127, whereby the effects of dimensional error of the yoke 120 or other components may be avoided as much as possible. Thus, the sliding member 126 may be guided smoothly with good slidability on the inner peripheral face thereof.

The sliding member 126 has a thick-walled, generally cylindrical overall shape, the outer circumferential surface thereof having a cylindrical face for sliding contact with the guide sleeve 124 on the one hand, while on the inner circumferential surface is integrally formed a projecting annular engaging projection 128 that projects inwardly at a medial portion in the axial direction. The sliding member 126 is inserted into the guide sleeve 124, with the outer circumferential surface in the axial upper portion thereof arranged in close proximity to one yoke 120 and the axial lower face thereof positioned in juxtaposition to the other yoke 122 in the axial direction, arranged in a magnetic gap zone formed between the two yokes 120, 122. Accordingly, by applying current through coil 118, magnetic force is exerted on the sliding member 126 by the yokes 120, 122, so that the sliding member 126 is actuated in the axial direction while being guided by the guide sleeve 124.

As regards the electromagnetic oscillator 114, a flange portion 130 formed on the lip of the opening of the housing 116 is positioned on the fixing plate 90 of the annular retaining member 82 in the closure member 76, and together with the annular retaining member 82 is caulked to the second mounting member 14 by means of the caulking lip 68. By so doing, the electromagnetic oscillator 114 is attached with a center axis of slide of the sliding member 126 generally coincident with the center axes of the first and second mounting members 12, 14.

Into the electromagnetic oscillator 114 attached in this manner, the drive shaft 86 of the oscillating plate 80 is inserted from above on the center axis thereof such that the drive shaft 86 is passed through an engaging projection 128 of the sliding member 126. A coil spring 132 is inserted over the drive shaft 86 and arranged straddling the gap between the opposing faces of the oscillating plate 80 and the engaging projection 128 of the sliding member 126, with a positioning nut 134 threaded onto the distal end portion of drive shaft 86 that has been passed through the engaging projection 128. The positioning nut 134 is then threaded onto drive shaft 86 and, via the engaging projection 128 of the sliding member 126, compresses the coil spring 132 between it and the oscillating plate 80, thereby positioning the sliding member 126 with respect to the drive shaft 86, and bringing about elastic connection through the urging force of the coil spring 132. By so doing, actuating force acting on the sliding member 126 through application of current to the coil 118 may be exerted on drive shaft 86. As is apparent from the above description, the guide rod in this embodiment is constituted so as to include the sliding member 126 and drive shaft 86.

In short, by adjusting the amount by which the positioning nut 134 is screwed onto drive shaft 86, it is possible to modify in the axial direction the mount position of the sliding member 126 with respect to the oscillating plate 80, which is supported positioned elastically with respect to the second mounting member 14 by support rubber plate 78. This arrangement makes it possible to make fine adjustment of the distance between the opposed, magnetic force working faces of sliding member 126 with respect to yoke 122. Additionally, in this embodiment, a locking bolt 136 is tightened into the positioning nut 134 from the axial lower side. With the locking bolt 136 coming into abutment with the distal end of the drive shaft 86 within the screw hole of positioning nut 134, the fastening location of the positioning nut 134 with respect to the drive shaft 86 is locked.

Also, a through hole 140 is formed in the center of the bottom wall in the housing 116 of electromagnetic oscillator 114, so that the yoke 122 positioned opposed to the sliding member 126 and exerting magnetic force thereon is exposed to the outside, as well as allowing the internal space of the electromagnetic oscillator 114 in which the sliding member 126 is placed to open directly to the outside via the central hole 142 of yoke 122. Also, by inserting a hexagonal wrench or similar tool through this opening and into the opening of the central hole 142 of yoke 122, it is possible to operate the aforementioned locking bolt 136 and positioning nut 134 to adjust the position of the sliding member 126 from the outside.

Figure 2:
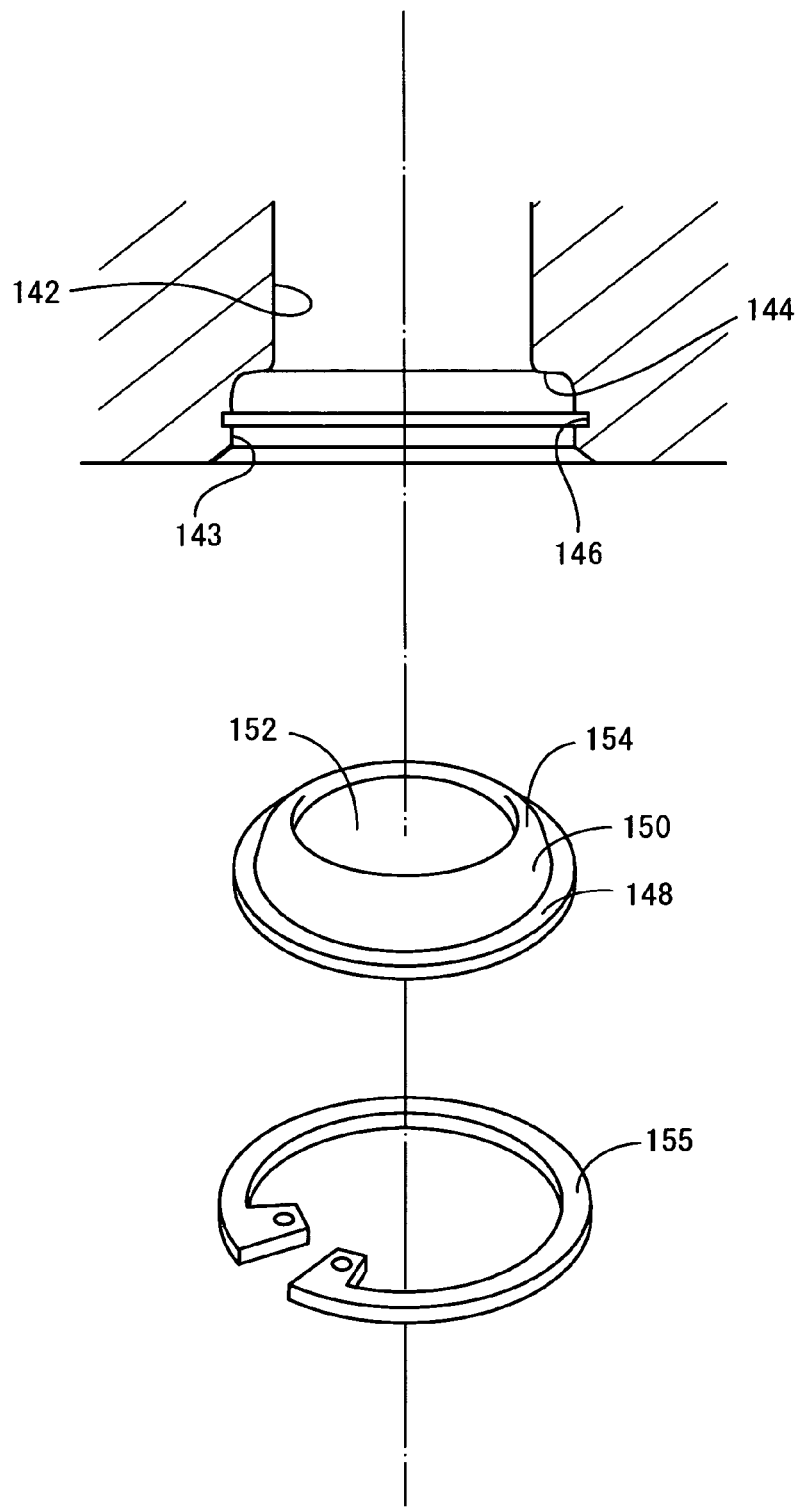
FIG. 2 is an exploded view suitable for explaining a sealing structure provided to a guide bore of an electromagnetic oscillator used in the engine mount of FIG. 1.
Figure 3:
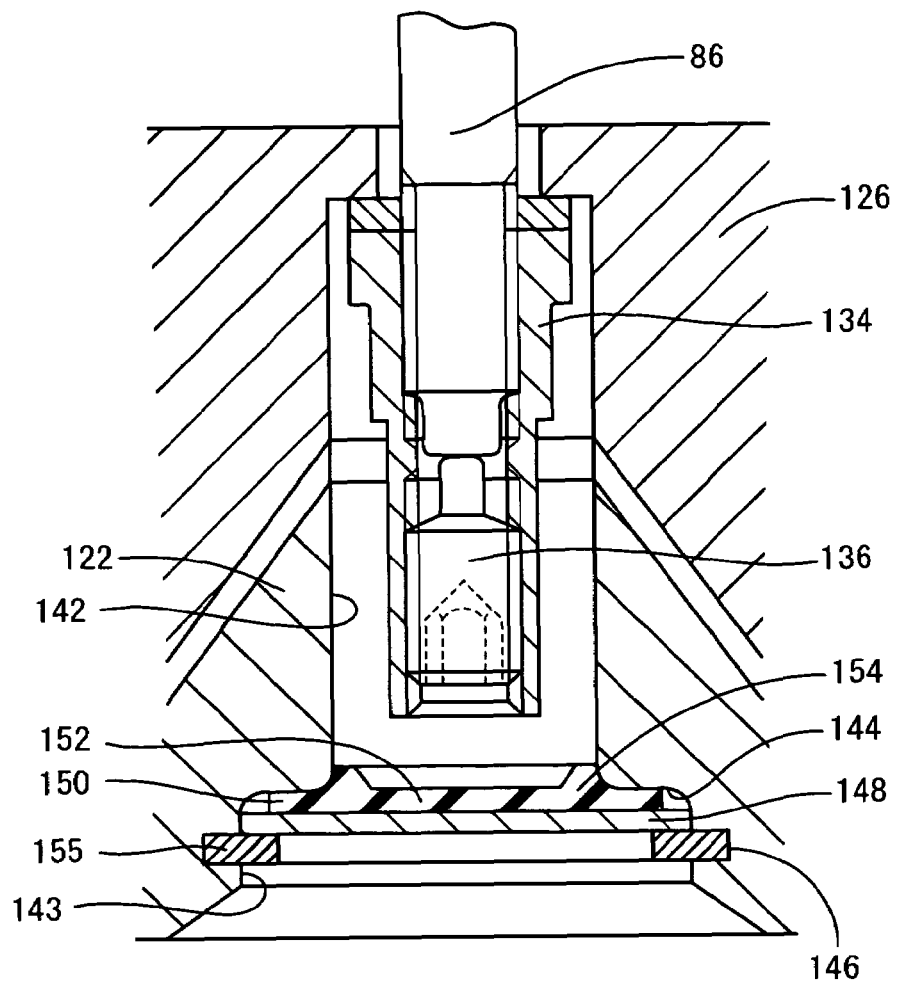
FIG. 3 is an enlarged view of a principle part of the engine mount of FIG. 1.

As is more apparent from FIG. 2, the central hole 142 of the yoke 122 is expanded in diameter in proximity to the opening to produce a large diameter portion 143, and a shoulder surface 144 is formed as an annular shoulder portion situated on the axial inside of the opening. On the inner circumferential surface of the large diameter portion 143 is formed an annular engaging groove 146 extending continuously around the circumference. As shown in FIG. 2, a lid metal plate 148 is assembled into the large diameter portion 143.

This lid metal plate 148 is of disk shape, and has a rubber layer 150 formed over substantially one entire face thereof and bonded to the face through vulcanization molding. This rubber layer 150 is formed from a cushion rubber part 152 in the central portion, and an annular sealing rubber 154 in the outside peripheral portion, slightly thicker than the cushion rubber part 152. The lid metal plate 148 is fitted into the large diameter portion 143 of the yoke 122, and the snap ring of C-letter shape 155 is fitted into the large diameter portion 143 from the outside of the lid metal plate 148, and installed therein engaged by the engaging groove 146.

By means of this arrangement, the outside face of the lid metal plate 148 is pressed by the snap ring of C-letter shape 155 and the outside peripheral portion of the lid metal plate 148 abuts the shoulder surface 144 via the annular sealing rubber 154. With this arrangement, the central hole 142 formed in the yoke 122 of electromagnetic oscillator 114 is provided with fluid-tight closure in the large diameter portion 143 formed in the opening thereof. The central portion of the lid metal plate 148 is positioned in opposition axially below across a predetermined gap with respect to the end face of the positioning nut 134, which is threaded onto the distal end of the drive shaft 86 of the oscillating plate 80. By means of this arrangement, in the event that heavy vibrational load is input across the first mounting member 12 and second mounting member 14 so that the pressure receiving chamber 100 is subjected to excessive pressure, the positioning nut 134 will come into abutment with the lid metal plate 148 via the cushion rubber part 152, thereby limiting in cushionwise fashion the amount of displacement of oscillating plate 80.

Figure 4:
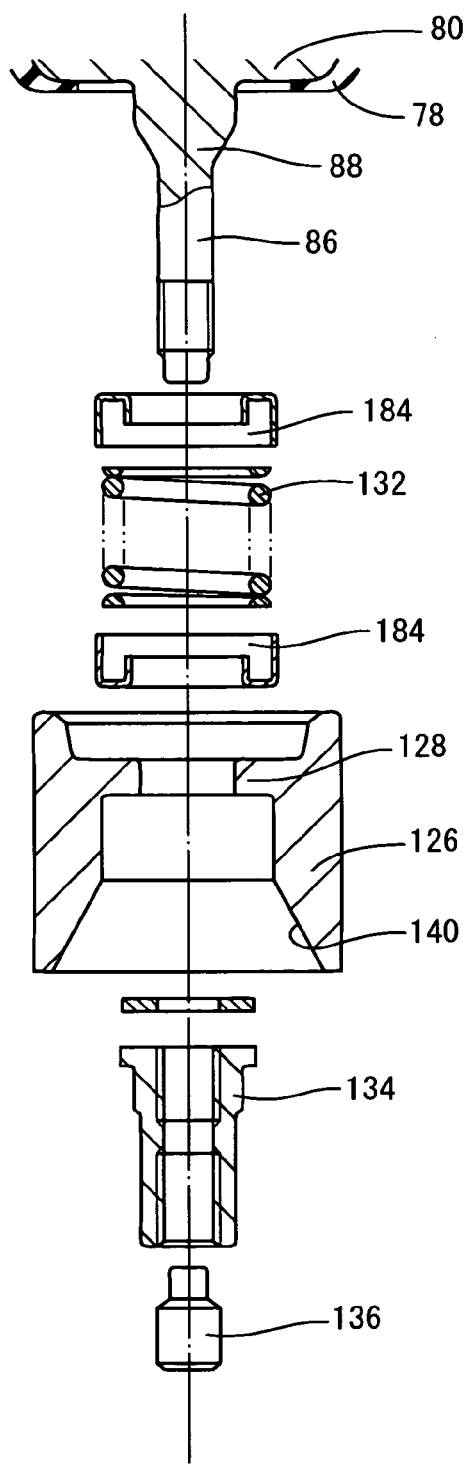
FIG. 4 is an exploded view suitable for explaining assembly structure of fixation of the sliding member against an oscillating plate in the engine mount of FIG. 1.
Figure 5:
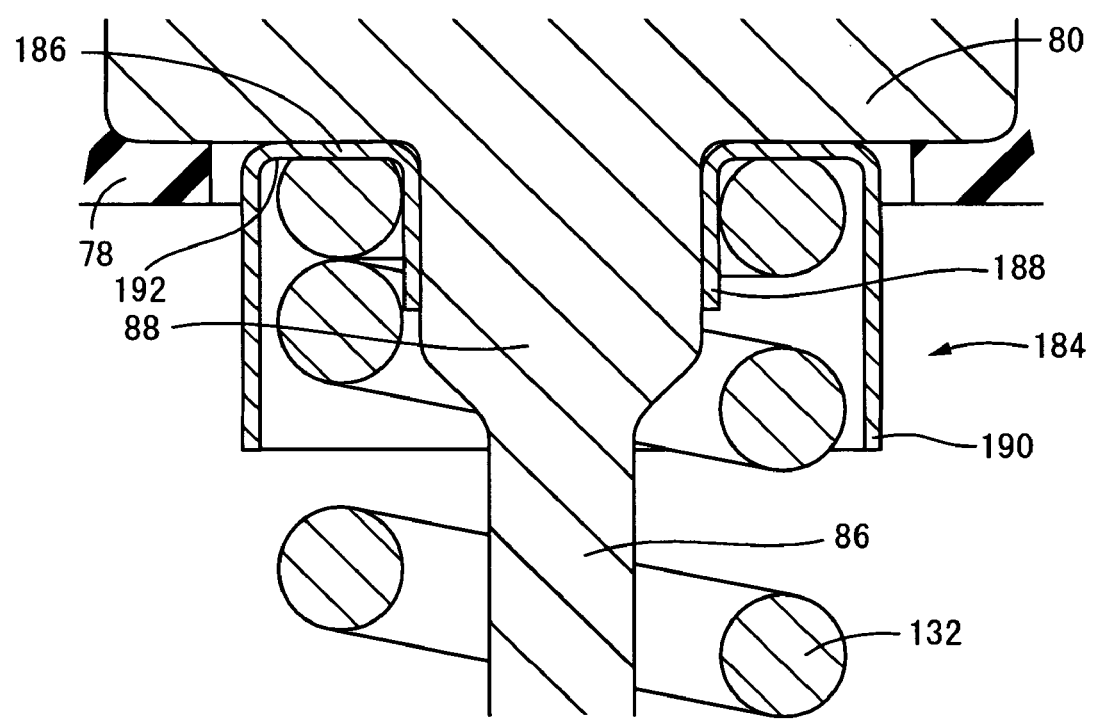
FIG. 5 is an enlarged view of another principle part of the engine mount of FIG. 1.

Additionally, as shown in FIG. 4, a spring seat 184 is installed on each of the axial ends of the coil spring 132 that is disposed about the drive shaft 86 as a first and a second spring seat, whereby the upper and lower ends of the coil spring 132 is pressed, via spring seats 184, under urging force against the opposed faces of the oscillating plate 80 and the engaging projection 128 of sliding member 126, respectively. As shown in FIG. 5, the spring seat 184 has an inner circumferential wall 188 and an outer circumferential wall 190 integrally rising up from the inner and outer peripheral edges of an annular bottom wall 186, forming an annular groove shape having an annular groove open at one side in the axial direction. Spring seats 184, 184 are arranged covering the axial ends of the coil spring 132, installed with the bottom wall 186 placed against the opposed face of the oscillating plate 80 and engaging projection 128, respectively.

Here, the spring seat 184 is fabricated of material having excellent wear strength and machining strength so as to exhibit adequate strength against contact with the coil spring 132, and stainless steel or other metal material is particularly good. In order to avoid producing an edge on the peripheral outside face of the spring seat 184 as well, it is preferable to subject the connecting zones of inner and outer walls 188, 190 with the annular bottom wall 192 to chamfering to a rounded shape. As regards the coil spring 132 as well, the material may preferably be processed in such a way as to avoid as much as possible an edge at the end portion that contacts the spring seat 184. For this reason, a closed end structure is preferred over an open end, and spring ends subjected to an end process such as grinding or tapering are preferred to unground ends.

In this embodiment in particular, the inside diameter dimension of the inner circumferential wall 188 of the spring seat 184 is set to about equal the outside diameter dimension of the large diameter portion 88 of drive shaft 86, and in the installed state, the inner circumferential surface of the inner circumferential wall 188 of the spring seat 184 is positioned contacting the outer peripheral face of the large diameter portion 88 of the drive shaft 86, over generally the entire circumference in the circumferential direction. The outside diameter dimension of the inner circumferential wall 188 of the spring seat 184 is set to about equal the coil inside diameter dimension of the coil spring 132, and in the installed state, the inner circumferential surface of the coil spring 132 is superposed in a state of contact with the outer peripheral face of the inner circumferential wall 188 of the spring seat 184, over generally the entire circumference in the circumferential direction. By means of this arrangement, the upper end the coil spring 132 is positioned against the bottom face of the oscillating plate 80 via the spring seat 184, in a state of being positioned in the axis-perpendicular direction such that there is substantially no chatter against the large diameter portion 88 of the drive shaft 86 via the spring seat 184.

Also, in this embodiment, the support rubber plate 78 is bonded through vulcanization molding only to the outside peripheral portion of oscillating plate 80, and the inside peripheral portion of the bottom face of the oscillating plate 80 with the spring seat 184 positioned thereon is substantially devoid of covering by the support rubber plate 78 so as to be exposed directly to oscillating plate 80.

In the engine mount 10 having the structure described hereinabove, a cylindrical bracket 156 is externally fitted onto the electromagnetic oscillator 114. The cylindrical bracket 156 has a flange portion 158 formed at the upper end opening. This flange portion 158, together with the flange portion 42 of the elastic body-side outer sleeve member 22, fixing plate 90 of the annular retaining member 82, and the flange portion 130 of the housing 116, is caulked to the diaphragm-side outer sleeve member 24 by forcedly bending the calking lip 68 against these members through a caulking fixation process. A fixing plate member 160 is formed at the bottom end opening of the cylindrical bracket 156, and a plurality of mount holes (not shown) are formed on the fixing plate member 160.

While not shown in the drawings, the engine mount 10 is installed between the power unit and the body, by fixing the fixing plate portion 58 of the first mounting member 12 to the power unit by a fastening bolt passed through the bolt hole 59, while fixing the second mounting member 14 to the car body with a fastening bolt, via the cylindrical bracket 156. In the installed state, when vibration is input across the first mounting member 12 and the second mounting member 14, fluid flow through the orifice passage 112 is generated on the basis of a pressure differential generated between the pressure receiving chamber 100 and the equilibrium chamber 106 in association with elastic deformation of the rubber elastic body 16, so that passive vibration damping action is exhibited on the basis of resonance or flow action of the fluid. By controlling current flow to the coil 118 at frequency and phase depending on the vibration being damped while actuating oscillation of the oscillating plate 80 with the electromagnetic oscillator 114, pressure fluctuations are exerted by the oscillating chamber 104 on vibration receiving chamber 102 through the orifice passage 96, so that active damping action of input vibration is obtained through active control of fluid pressure fluctuations in the vibration receiving chamber 102.

In the engine mount 10 of the present embodiment, there is employed an arrangement whereby the internal space in the electromagnetic oscillator 114 in which the sliding member 126 is placed opens to the outside through the central hole 142 of the yoke 122. Additionally, the opening of the central hole 142 is provided with closure by means of the snap ring of C-letter shape 155 which prevents the lid metal plate 148 (simply fitted therein) from becoming dislodged, whereby the following unique advantages are provided.

(a) Since the lid metal plate 148 can be quickly and easily attached or removed simply by constricting the diameter of the snap ring of C-letter shape 155 using a pin or the like, to engage or dislodge it from the engaging groove 146, the central hole 142 of the yoke 122 can be quickly and easily opened and closed.

(b) Since the engagement direction of the snap ring of C-letter shape 155 in the engaging groove 146 is generally perpendicular to the axial direction, which is the direction in which input vibration and oscillating force act, the snap ring of C-letter shape 155 is stably retained in the engaged state, even in an installed condition where it is subjected to input vibration and oscillating force.

(c) Since the lid metal plate 148 has a rubber layer 150 directly vulcanization bonded thereto, with the central hole 142 being sealed by this rubber layer 150, there is no need to install a separate O-ring or the like, thus reducing the number of parts required and simplifying the assembly operation.

(e) Since the central hole 142 of the yoke 122 can be quickly and reliably sealed by the lid metal plate 148 and snap ring of the C-letter shape 155, the problem of infiltration by dust or the like can be avoided, while making it possible to adopt a structure wherein the central hole 142 of the yoke 122 is open to the outside, thereby making it possible to adopt a structure wherein position adjustments of the sliding member 126 or maintenance may be carried out from the outside, by means of operating the positioning nut 134.

Also, in the engine mount 10 constructed as described above, the cylindrical bracket 156 is externally fitted onto the electromagnetic oscillator 114. The cylindrical bracket 156 has the flange portion 158 formed at the upper end opening, and this flange portion 158, together with the flange portion 42 of the elastic body-side outer sleeve member 22, the fixing plate 90 of the annular retaining member 82, and the flange portion 130 of the housing 116, is caulked to diaphragm-side outer sleeve member 24 by the caulking lip 68 through the aforesaid caulking fixation process. Further, the fixing plate member 160 is formed at the bottom end opening of the cylindrical bracket 156, and a plurality of mount holes (not shown) are formed on the fixing plate member 160.

Additionally, the coil spring 132 which elastically connects the oscillating plate 80 to the sliding member 126 abuts against the oscillating plate 80 via the spring seat 184, thereby avoiding direct abutment of the oscillating plate 80 against the coil spring 132. Thus, even where the bottom face of the oscillating plate 80 has been coated with adhesive for the purpose of vulcanization molding of the support rubber plate 78, or where the support rubber plate 78 has been deposited in thin flash profile, the coil spring 132 does not come into direct contact with the oscillating plate 80. Therefore it is prevented the problem of dust being produced through abrasion of the adhesive coating or rubber flash on the bottom face of the oscillating plate 80, due to interference by the edge portion of the coil spring 132 or to rotational displacement of the coil spring 132, for example, and effectively avoiding the problem of misoperation or diminished durability resulting from dust infiltrating into the moving parts of the electromagnetic oscillator 114 or the like.

In this embodiment, since the coil spring 132 is positioned on the drive shaft 86 via the spring seat 184, sliding contact of the coil spring 132 with the spring seat 184, or relative displacement of the spring seat 184 and the oscillating plate 80, may be prevented. As a result, stable urging force on the part of the coil spring 132 may be exerted across the oscillating plate 80 and the sliding member 126, further improving the stability of operation, as well as avoiding as much as possible the problem of wear and creation of dust resulting from sliding contact among the coil spring 132, spring seat 184, and the oscillating plate 80.

In this embodiment, the spring seat 184 is also interposed at the location where the coil spring 132 is positioned on the sliding member 126, preventing direct contact by the coil spring 132, so that when selecting the material for the sliding member 126, there is no need to consider wear resistance against contact by the coil spring 132, which has the advantage of improving the degree of freedom in materials selection for the sliding member 126, and attendant improvement in the characteristics of the electromagnetic oscillator 114.

While the invention has been shown and described hereinabove with reference to one preferred embodiments for the illustrative purpose only, it is to be understood that the present invention is not limited to the details of the illustrated embodiments. It is also to be understood that the present invention may be embodied with various changes, modifications and improvements which may occur to those skilled in the art, without departing from the spirit and scope of the invention.

Figure 6:
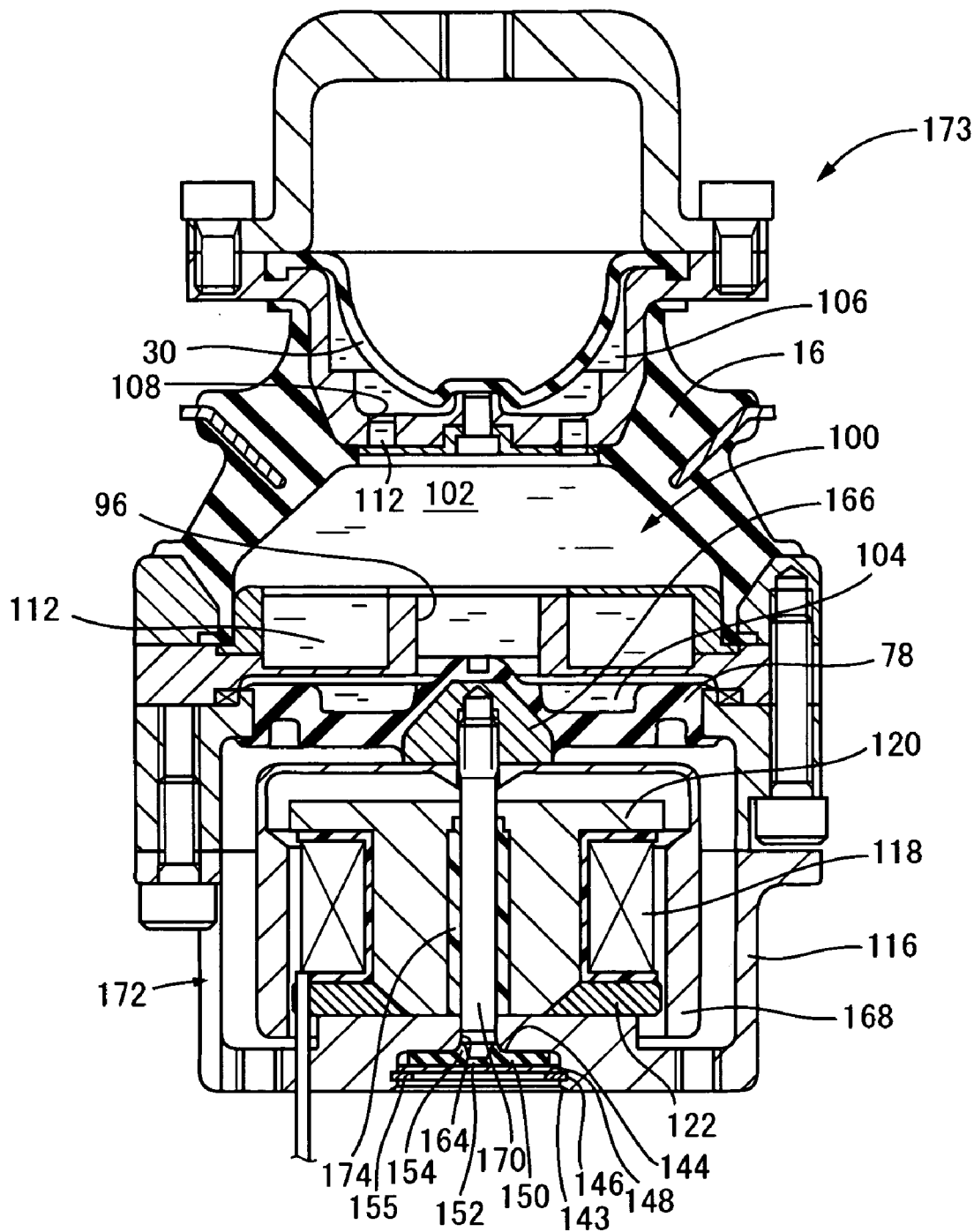
FIG. 6 is an elevational view in axial or vertical cross section of an automotive engine mount constructed according to a second embodiment of the invention.

For example, in the preceding embodiments, there is described on example of an instance in which the structure of the invention is implemented for the purpose of providing closure to the opening of the central hole 142 provided for making positional adjustments of the sliding member 126 that serves as the armature. However, the invention is applicable also to actuators of various electromagnetic or magnetic types. Specifically, in the electromagnetic actuator 172 of the structure shown in FIG. 6 by way of example, a cylindrical magnetic member 168 constituting an armature fixed to a valve 166 which serves as the output member is arranged externally fitting onto a coil 118 fixed in a housing 116, while a guide bore 164 is formed extending on the center axis with respect to the yokes 120, 122 that are mounted on the coil 118, and slidably inserting a guide rod 170 projected from valve 166 into the guide bore 164. It would possible to employ a structure comprising the lid metal plate 148 and the snap ring of C-letter shape 155 similar to those in the preceding elements, in order to provide closure at the opening area of the guide bore 164. In FIG. 6, the same reference numerals as used in the illustrated embodiments are used for identifying structurally and functionally corresponding elements, to facilitate understanding of the instant embodiment.

Referring next to FIG. 6 showing an engine mount 173 constructed according a the second embodiment of the invention, the sliding sleeve 174 composed of self-lubricating resin material or the like is installed in the guide bore 164. With the engine mount 173 shown in FIG. 6, by selectively switching power supply to the coil 118 between a continuous energized state and an interrupted state, the orifice passage 96 is switched between an energized state and an interrupted state by the valve 166, to thereby give selective switching control of passive vibration damping characteristics. However, it would be possible, as in the preceding embodiment to supply to the coil 118 current of frequency corresponding to the vibration to be damped, to produce active vibration damping action.

Besides an engine mount of the sort described hereinabove, the invention may also be implemented in an active damper. Specifically, such a damper may be constructed, for example, using the electromagnetic oscillator 114 described in the first element by itself independently of the first and second integral vulcanization products 28, 32, by attaching a closure member 76 to the opening of the housing 116 thereof, and caulking the fixing plate 90 in the annular retaining member 82 to the flange 130 of the housing 116. That is, in a damper constructed in this way, the fixing the oscillating plate 80 is stationary fixed to a vibrating member to be damped, and the housing 116 with the coil 118 housed therein is supported, so as to be elastically connected to the vibrating member via the support rubber plate 78, whereby the housing 116 containing coil 118 can be made to act as an actively oscillating mass with respect to the vibrating member, when current is supplied to coil 118.

For example, in the preceding embodiments, the guide sleeve for guiding the sliding member 126 in the axial direction is elastically assembled with respect to the yokes 120, 122. However, it would be possible instead to employ a guide sleeve that is fixed with respect to the yokes 120, 122, with the guide face for the sliding member 126 being formed by the yokes 120, 122.

Besides an engine mount of the sort described hereinabove, the invention may also be implemented in an active damper. Specifically, such a damper may be constructed, for example, using the electromagnetic oscillator 114 described in the first embodiment by itself independently of the first and second integral vulcanization products 28, 32, by attaching a closure member 76 to the opening of the housing 116 thereof, and caulking the fixing plate 94 in the annular retaining member 82 to the flange 130 of the housing 116. That is, in a damper constructed in this way, for example, the oscillating plate 80 is stationarily fixed to a vibrating member to be damped, and the housing 116 with the coil 118 housed therein is supported, so as to be elastically connected to the vibrating member via the support rubber plate 78, whereby the housing 116 containing the coil 118 can be made to act as an actively oscillating mass with respect to the vibration member, when current is supplied to the coil 118.

Additionally, the present invention may be realized advantageously by including a bound stop mechanism for cushionwise limiting of the amount of elastic deformation of the rubber elastic body in the bound direction. Hereinbelow, an active vibration damping apparatus comprising a vibration damping actuator pertaining to the present invention, equipped with such a bound stop mechanism, is described with reference to FIGS. 7–10, by way of a third element of the invention. In the third element hereinbelow, since an electromagnetic oscillator 114 similar to that in the preceding elements is used as the vibration damping actuator, the same symbols used in the preceding elements are assigned in the drawings, and no detailed description is provided.

Figure 7:
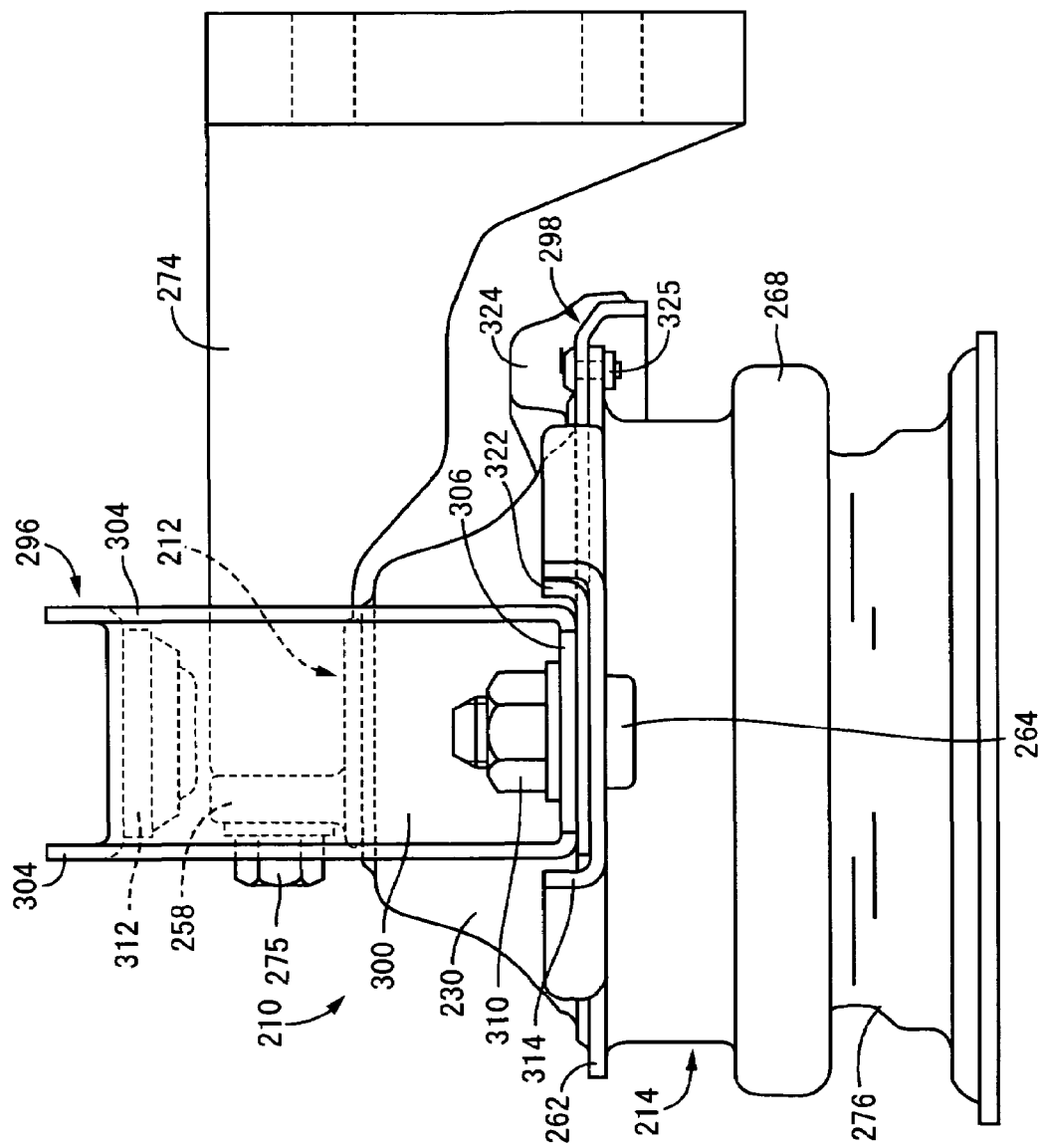
FIG. 7 is an elevational view in axial or vertical cross section of an automotive engine mount constructed according to a third embodiment of the invention.
Figure 8:
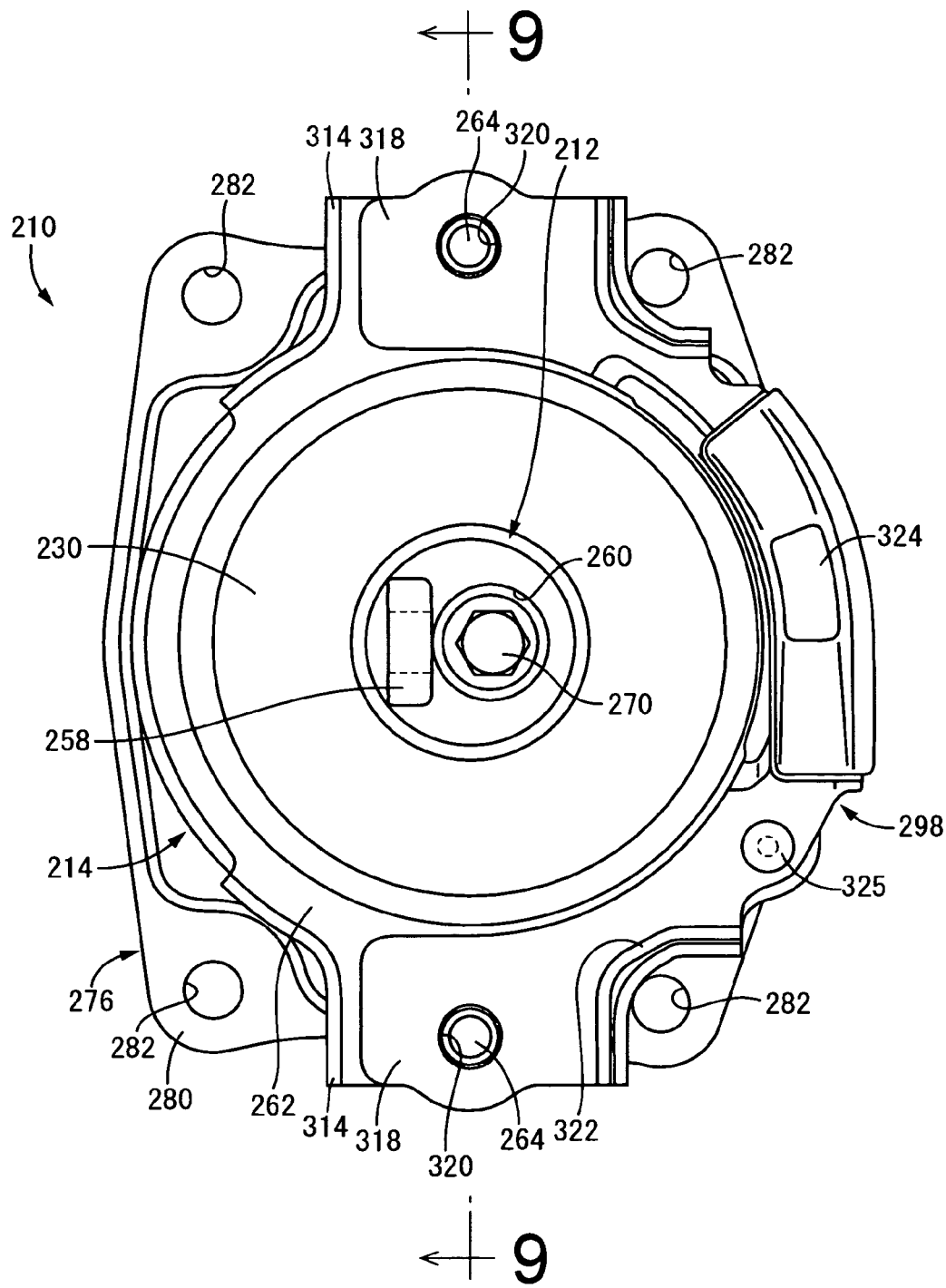
FIG. 8 is a plane view of the engine mount of FIG. 1 where a rebound stop member is removed.
Figure 9:
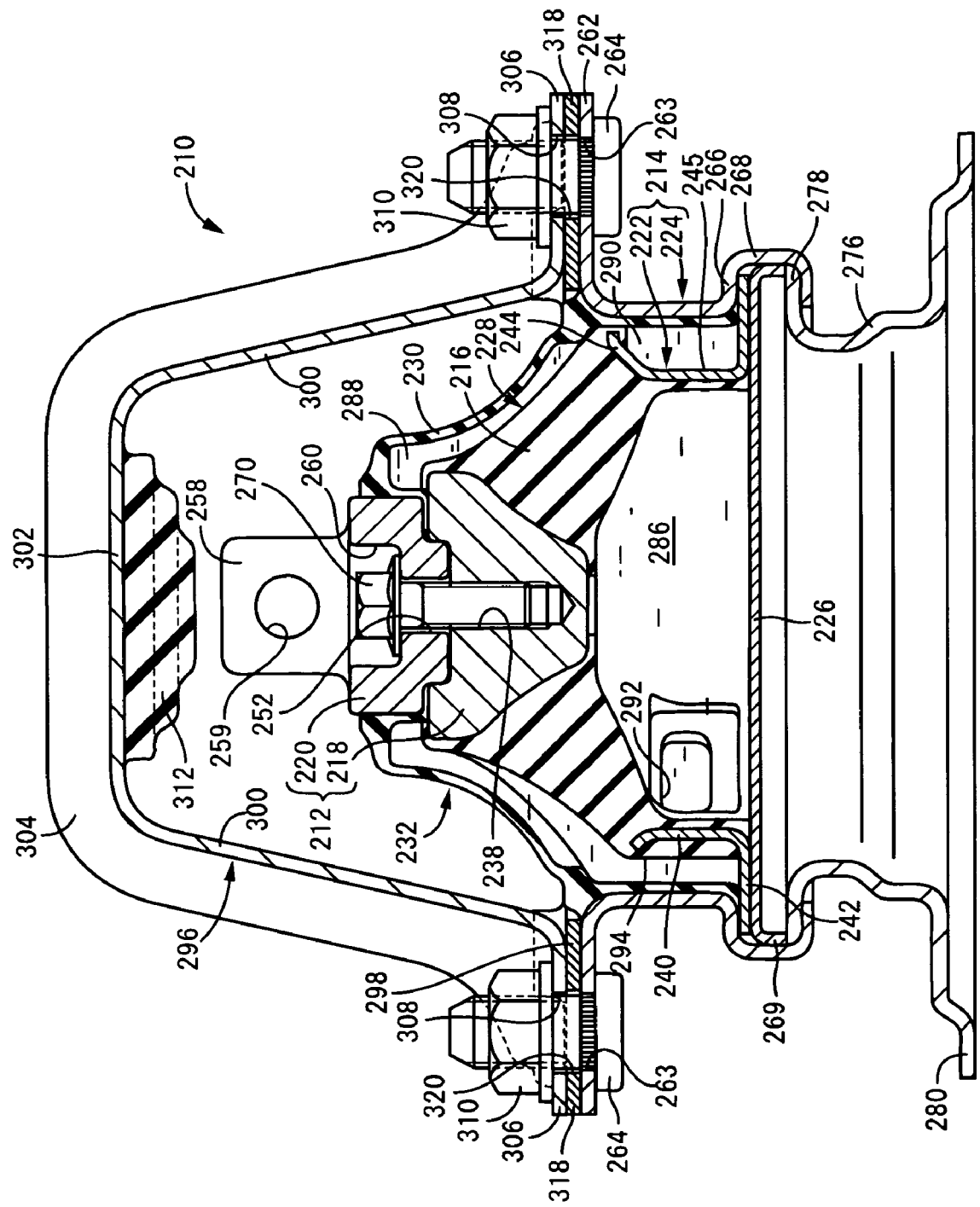
FIG. 9 is a cross sectional view taken along line 9—9 of FIG. 8.

Referring next to FIGS. 7–9, there is depicted an automobile engine mount 210 by way of a third element of the invention. To aid understanding, FIG. 8 shows the rebound stop member (described later) removed. This engine mount 210 has a structure wherein a first mounting member 212, and a second mounting member 214, are elastically connected by means of a rubber elastic body 216. The first mounting member 212 is mounted to an automobile power unit (not shown), and the second mounting member 214 is mounted to the car body (not shown), so that the power unit is provided with vibration-damped support on the body. In such an installed state, between the first mounting member 212 and second mounting member 214, any shared load of the power unit or principal vibration to be damped will be input on the center axis (the vertical direction in FIGS. 7, 9) in the engine mount 210. In the description hereinbelow, vertical direction refers as a general rule to the vertical direction in FIG. 7.

Described in detail, the first mounting member 212 is composed of an elastic body central member in the form of an elastic body-side inner member 218, and a rubber film central member in the form of a diaphragm-side inner member 220. The second mounting member 214 is composed of an elastic body-side outer member in the form of an elastic body-side outer sleeve member 222, a rubber film outer member in the form of a diaphragm-side outer sleeve member 224, and a metallic lid plate 226. The elastic body-side inner member 218 and the elastic body-side outer sleeve member 222 are vulcanization bonded to the rubber elastic body 216 to constitute a first integral vulcanization product 228, while the diaphragm-side inner member 220 and the diaphragm-side outer sleeve member 224 are vulcanization bonded to a flexible rubber film in the form of a diaphragm 230, to constitute a second integral vulcanization product 232. The first and second integral vulcanization products 228, 232 are assembled together.

The elastic body-side inner member 218 of the first integral vulcanization product 228 has an inverted, generally frustoconical shape. A tapped hole 238 opening onto the upper face is formed in the elastic body-side inner member 218.

The elastic body-side outer sleeve member 222 comprises a cylindrical wall portion 240 having a generally large diameter cylindrical shape; at the lower axial end of this cylindrical wall portion 240 is integrally formed a flange portion 242 that spreads outwardly in the diametrical direction. The upper axial end of this cylindrical wall portion 240 constitutes a tapered cylindrical portion 244 that gradually opens out moving upward in the axial direction. With this arrangement, a circumferential groove 245 open on the outer circumferential surface and extending a length just short of one turn in the circumferential direction is formed on the elastic body-side outer sleeve member 222. Spaced some distance apart above the elastic body-side outer sleeve member 222, the elastic body-side inner member 218 is arranged some distance apart but on substantially the same center axis. In this states, the outer peripheral face of the inverted taper of elastic body-side inner member 218 and the inner circumferential surface of the tapered cylindrical portion 244 in the elastic body-side outer sleeve member 222 are arranged spaced apart in opposition with one another. The opposed faces of the outer peripheral face of the inverted taper of elastic body-side inner member 218 and the inner circumferential surface of tapered cylindrical portion 244 are elastically connected by means of the rubber elastic body 216.

The rubber elastic body 216 overall has a large-diameter frustoconical shape, and in the central portion thereof has the elastic body-side inner member 218 positioned coaxially therewith and vulcanization bonded thereto, while the tapered cylindrical portion 244 of the elastic body-side outer sleeve member 222 is positioned on and vulcanization bonded to the outer peripheral face of the large diameter end thereof. By means of this arrangement, the rubber elastic body 216 is constituted as the first integral vulcanization product 228 comprising the elastic body-side inner member 218 and elastic body-side outer sleeve member 222 as described above.

On the other hand, the diaphragm-side inner member 220, as a part of the second integral vulcanization product 232, has a thick-walled disk shape spreading out in the axis-perpendicular direction, with a bore 252 passing through the generally central portion thereof. At the outer peripheral portion of diaphragm-side inner member 220 a fixing plate portion 258 projects upwardly, and a through hole 259 for a fastening bolt passes through the central portion of fixing plate portion 258. A bolt head housing 260 is formed on the upper face of diaphragm-side inner member 220.

The diaphragm-side outer sleeve member 224 has a thin-walled, large diameter cylindrical shape, at the opening at the axial upper end of which is integrally formed an annular support 262 that spreads out like a flange outwardly in the diametrical direction. The annular support 262 has a pair of through holes 263, 263 bored through its side portions at opposing locations in the diametrical direction, into each of which through holes 263, 263 is forced a fixation bolt 264 that is implanted pointing upward. Additionally, a shoulder portion 266 of the annular disk shape extending diametrically outward is integrally formed at the opening on the axial bottom end of the diaphragm-side outer sleeve member 224, and a cylindrical caulking sleeve portion projecting downward in the axial direction is integrally formed on the outside peripheral edge of the shoulder portion 266.

Spaced some distance apart in the axial direction above the diaphragm-side outer sleeve member 224, the diaphragm-side inner member 220 is arranged on substantially the same center axis, with the diaphragm-side outer sleeve member 224 and diaphragm-side inner member 220 elastically connected by means of the diaphragm 230.

The diaphragm 230 is formed of a thin rubber film, and in order to permit it to readily undergo elastic deformation, has a generally annular or cylindrical shape extending in the circumferential direction, with a bowed cross section having an appreciable slack. The inner peripheral edge of the diaphragm 230 is bonded by vulcanization to the outer peripheral edge of the diaphragm-side inner member 220, and the outer peripheral edge of the diaphragm 230 is bonded by vulcanization to the opening at the axial upper end of the diaphragm-side outer sleeve member 224.

The second integral vulcanization product 232 is assembled positioned from above onto the aforementioned first integral vulcanization product 228, and the diaphragm-side inner member 220 is fixed to the elastic body-side inner member 218, while the diaphragm-side outer sleeve member 224 is fixed to the elastic body-side outer sleeve member 222. Additionally, the diaphragm 230 is positioned spaced apart outwardly from the rubber elastic body 216 in the diametrical direction, so as to cover the entire outer circumferential surface of the rubber elastic body 216.

That is, the diaphragm-side inner member 220 is positioned directly on the elastic body-side inner member 218, and a connecting bolt 270 is passed through the bore 252 in the diaphragm-side inner member 220 and threaded into the tapped hole 238 of the elastic body-side inner member 218, fastening together the two members 220, 218 to produce the first mounting member 212. As shown in FIG. 7, to the first mounting member 212 is attached a first bracket 274 positioned on the upper face of diaphragm-side inner member 220 and extending sideways to one side in the axis-perpendicular direction from fixing plate portion 258, and fastened with fixation bolt 275 passed through through hole 259 in fixing plate portion 258. The first mounting member 212 is then stationarily mounted on an automobile power unit (not shown) via the first bracket 274.

The diaphragm-side outer sleeve member 224 is externally fitted onto the elastic body-side outer sleeve member 222 from above in the axial direction. At the lower end of the elastic body-side outer sleeve member 222, the outside peripheral edge of the shoulder portion 266 is positioned over the shoulder portion 266 of the diaphragm-side outer sleeve member 224 in the axial direction. At the upper end, on the other hand, the opening edge of the tapered cylindrical portion 244 is positioned in the diametrical direction with respect to the inner circumferential surface of the diaphragm-side outer sleeve member 224. By caulking the caulking sleeve portion 268 of the diaphragm-side outer sleeve member 224 to the outer peripheral edge of the flange portion 242 of the elastic body-side outer sleeve member 222, the elastic body-side outer sleeve member 222 and the diaphragm-side outer sleeve member 224 are assembled by being fixed together. At each of the areas at the upper and lower ends of elastic body-side outer sleeve member 222 that are positioned on diaphragm-side outer sleeve member 224, there is interposed a seal rubber integrally formed with rubber elastic body 216 or diaphragm 230, providing a fluid tight sealing.

By means of this arrangement, the circumferential groove 245 formed in elastic body-side outer sleeve member 222 is provided with fluid-tight closure by the diaphragm-side outer sleeve member 224, thereby forming an annular passage that extends a predetermined distance in the circumferential direction between the diametrically opposed faces of the diaphragm-side outer sleeve member 224 and the cylindrical wall portion 240 of the elastic body-side outer sleeve member 222. Additionally, at the lower end of the elastic body-side outer sleeve member 222, a metallic lid plate 226 of large-diameter disk shape is positioned, with the outer peripheral edge of metallic lid plate 226 positioned directly in the axial direction on the outside peripheral edge of the flange portion 242 of elastic body-side outer sleeve member 222. The metallic lid plate 226 is, together with the flange portion 242, caulked by the caulking sleeve portion 268 of the diaphragm-side outer sleeve member 224. By means of this arrangement, the opening at the lower end of the elastic body-side outer sleeve member 222 is provided with a fluid-tight closure by the metallic lid plate 226.

On the outside peripheral edge of the metallic lid plate 226 is integrally formed an annular press-fit portion 269 that projects downward in the axial direction. Prior to caulking fixation, the annular press-fit portion 269 is press fit into the caulking sleeve portion 268 of the metallic lid plate 226, so that the lower opening of the diaphragm-side outer sleeve member 224 is provided with a fluid-tight closure by the metallic lid plate 226. Locations where the elastic body-side outer sleeve member 222 and metallic lid plate 226 meet are sealed in fluid-tight fashion through abutment by seal rubber integrally formed with the rubber elastic body 216.

The diaphragm-side outer sleeve member 224 and the elastic body-side outer sleeve member 222 assembled together in this manner are caulked together to produce the second mounting member 214, which second mounting member 214 is then elastically connected to the first mounting member 212 via the rubber elastic body 216. A second bracket 276 is attached to the lower opening of the second mounting member 214. This second bracket 276 has an overall shape that is generally a large-diameter cylinder. At the opening at the upper axial end thereof is integrally formed a flange portion 278 that spreads outwardly in the diametrical direction, and at the opening at the lower axial end thereof is integrally formed a fixation plate 280 that spreads outwardly in the diametrical direction. The second bracket 276 is assembled coaxially with the second mounting member 214 from below in the axial direction, and with respect to the shoulder portion 266 of the diaphragm-side outer sleeve member 224 of the second mounting member 214, is positioned directly on the metallic lid plate 226 and the flange portion 242 of the elastic body-side outer sleeve member 222 which have been positioned thereat. Together with the flange portion 242 and metallic lid plate 226, the second bracket 276 is then caulked held between the shoulder portion 266 and the caulking sleeve portion 268, and is fixedly attached thereby to the second mounting member 214. With this arrangement, the second bracket 276 projects axially downward from the second mounting member 214, and while not clearly shown in the drawings, is fixedly mounted on the car body, by means of several fastening bolts passed through a plurality of fixation holes 282 provided in the fixation plate 280 that projects from the lower opening.

By providing the lower opening of the second mounting member 214 with fluid-tight closure by means of metallic lid plate 226 as described above, a pressure receiving chamber 286 having non-compressible fluid sealed therein is formed between the opposing faces of the rubber elastic body 216 and metallic lid plate 226. This pressure receiving chamber 286 is partially defined by the rubber elastic body 216, and is designed to receive vibration and give rise to pressure fluctuations on the basis of elastic deformation of the rubber elastic body 216 during vibration input across the first mounting member 212 and the second mounting member 214.

The rubber elastic body 216 and the diaphragm 30 are respectively fastened at the inner peripheral edge and the outer peripheral edge to the first mounting member 212 and the second mounting member 214, thereby forming between the opposing faces of the rubber elastic body 216 and the diaphragm 230 an equilibrium chamber 288 having non-compressible fluid sealed therein. Specifically, this equilibrium chamber 288 is partially defined by the readily deformable diaphragm 230, and is designed to readily allow changes in volume on the basis of elastic deformation of diaphragm 230. As the non-compressible fluid sealed in the pressure receiving chamber 286 and the equilibrium chamber 288, it is typically favorable to use a fluid with viscosity of 0.1 Pa·s or lower, in order to efficiently obtain vibration damping action, based on resonance or flow of the fluid flowing through the orifice passage 290 (described later) in the vibration frequency band required by the engine mount 210 of the vehicle.

To the pressure receiving chamber 286 formed above the rubber elastic body 216 and the equilibrium chamber 288 formed therebelow is connected an annular passage formed inside the second mounting member 214, through communication holes 292, 294 formed at the two circumferential ends of the passage, thereby forming over a predetermined distance an orifice passage 290 through which the pressure receiving chamber 286 and equilibrium chamber 288 communicate with each other, allowing fluid flow between the two chambers 286, 288. As is widely known, flow of fluid through the orifice passage 290 is created by relative pressure fluctuations created between the pressure receiving chamber 286 and equilibrium chamber 288 during vibration input, and thus effective damping action of input vibration is exhibited on the basis of flow action, such as sympathetic vibration, of the fluid. Damping action exhibited on the basis of flow action of fluid caused to flow through the orifice passage 290 can be adjusted in terms of frequency characteristics, by means of tuning the ratio of orifice passage 290 passage cross section to passage length, or the like.

On the other hand, a rebound stop member 296 and a bound stop member 298 are attached, at the upper opening end, to the diaphragm-side outer sleeve member 224 which is part of the second mounting member 214.

The rebound stop member 296 has a generally gate shape overall, obtained by bending a metal plate of predetermined width, and comprises a pair of leg portions 300, 300 as well as an upper wall portion 302 extending generally horizontally. At the two widthwise ends of the rebound stop member 296 are formed a pair of reinforcing ribs 304, 304 extending across the entire length of the pair of leg portions 300, 300 and the upper wall portion 302. The lower ends of the pair of leg portions 300, 300 are bent horizontally to produce flat fixation plate portions 306, 306, with a fixation bore 308 formed in each fixation plate portion 306.

The rebound stop member 296 is positioned on the opening from above the second mounting member 214, arranged straddling, in the diametrical direction, the rubber elastic body 216 that projects from the upper opening of the second mounting member 214, the diaphragm 30, the first mounting member 212, etc. The fixation plate portions 306, 306 at the ends of rebound stop member 296 are positioned on the annular support 262 of the diaphragm-side outer sleeve member 224. With this state, the fixation bores 308, 308 of the fixation plate portions 306, 306 are lined up with through holes 263, 263 formed in the annular support 262, while the fixation bolts 264, 264 implanted in the through holes 263, 263 are passed through the fixation bores 308, 308, and fastened, whereby the fixation plate portions 306, 306 are fixed to the annular support 262 by means of fastening nuts 310, 310.

The rebound stop member 296 is attached in a state of being spaced apart by a predetermined distance to the outside of the rubber elastic body 216, the diaphragm 230, and the first mounting member 212, so as to avoid interfering when the rubber elastic body 216 or the diaphragm 230 undergoes elastic deformation by a predetermined amount. The upper wall portion 302 of rebound stop member 296 is positioned in opposition to the first mounting member 212 spaced apart therefrom in the axial direction. A projecting rebound stop rubber 312 covers the lower face of the upper wall portion 302, which is the face opposed to the first mounting member 212.

By means of this arrangement, there is constituted a stop mechanism in the rebound direction, which is the direction in which the first mounting member 212 moves away from the second mounting member 214 in the direction of principal vibration input. When excessive load is exerted in the rebound direction across the first mounting member 212 and the second mounting member 214 in the mount installed state, the first bracket 274 bolted to the first mounting member 212 is caused to abut the stop member 296 via the rebound stop rubber 312, thereby limiting cushionwise the amount of displacement in the direction of relative separation of the first mounting member 212 and the second mounting member 214.

On the other hand, the bound stop member 298 has a plate shape that extends in a generally arcuate configuration for a predetermined width in plan view. At the two end portions of the outside peripheral edge are integrally formed reinforcing ribs 314, 314 which project upward. In particular, the two circumferential end portions of the bound stop member 298 constitute wide fixation plate portions 318, 318, with bores 320, 320 being bored in fixation plate portions 318, 318. In the circumferential central portion of bound stop member 298 is integrally formed a reinforcing rib 322 which projects upward at the outside peripheral edge, and a bound stop rubber 324 which projects upward in a state of spreading out up to the outer peripheral face of this reinforcing rib 322 is formed covering the upper face of the bound stop member 298.

The bound stop member 298 is positioned, over a range in excess of halfway around the circumferential direction, on the upper face of the annular support 262 in the diaphragm-side outer sleeve member 224 of the second mounting member 214. In the annular support 262, once the fixation plate portions 318, 388 of the bound stop member 298 have been superposed, the fixation plate portions 306, 306 of the rebound stop member 296 are superposed directly. The fixation bolts 264, 264 implanted in annular support 262 are then passed through the bores 320, 320 of these fixation plate portions 318, 318 and the fixation bores 308, 308 of fixation plate portions 306, 306, and fastening nuts 310, 310 that have been threaded onto the two fixation bolts 264, 264 are tightened, whereby the fixation plate portions 306, 306 of the rebound stop member 296 and the fixation plate portions 318, 318 of the bound stop member 298 are fixed together superposed in fluid-tight state against the annular support 262 over substantially the entire face.

With this arrangement, there is constituted a stop mechanism in the bound direction, which is the direction in which the first mounting member 212 moves closer to the second mounting member 214 in the direction of principal vibration input. When excessive load is exerted in the rebound direction across the first mounting member 212 and the second mounting member 214 in the mount installed state, the first bracket 274 bolted to the first mounting member 212 is caused to abut the bound stop member 298 via the bound stop rubber 324, thereby limiting cushionwise the amount of displacement in the direction of relative proximity of the first mounting member 212 and the second mounting member 214.

In this embodiment, a through hole is formed at a location in the circumferential central portion of the bound stop member 298, in corresponding areas of the rebound stop member 298 and the annular support 262 of diaphragm-side outer sleeve member 224, and a rivet 325 is installed in the through hole. This rivet 325 is able to temporarily fasten the bound stop member 298 to the annular support 262 with just enough strength to prevent it from becoming detached. By installing the rivet 325 once the bound stop member 298 has been assembled onto the annular support 262, the bound stop member 298 is prevented from coming off in the course of processes up to mounting and bolt fastening of the rebound stop member 296, or when replacing the rebound stop member 296.

The engine mount 210 having the construction described above is installed between the power unit and body of the vehicle in the manner described above, with the first mounting member 212 attached to the power unit via first bracket 214, and with the second mounting member 214 attached to the car body via the second bracket 276. In the installed state, when vibration is input across the first mounting member 212 and the second mounting member 214, fluid flow through the orifice passage 290 is generated on the basis of a pressure differential generated between pressure receiving chamber 286 and equilibrium chamber 288 in association with elastic deformation of rubber elastic body 216, whereby passive vibration damping action is exhibited on the basis of resonance or flow action of the fluid.

During manufacture of the engine mount 210, it is advantageous to assemble the metallic lid plate 226 in the axial direction with the assembled first integral vulcanization product 228 and the second integral vulcanization product 232, and press fit the annular press-fit portion 269 of the metallic lid plate 226 into the caulking sleeve portion 268 of the diaphragm-side inner member 220, while these components are submerged in a mass of non-compressible fluid, in order to seal in the non-compressible fluid at the same time that the pressure receiving chamber 286 and equilibrium chamber 288 are formed. Then the assembly is withdrawn from the non-compressible fluid, and then subjected to a caulking fixation on the sleeve portion 268 in air. Preferably, the rebound stop member 296 having rebound stop rubber 312 and the bound stop member 298 having bound stop rubber 324 are assembled subsequent to caulking.

In order to constitute a rebound stop mechanism and the bound stop mechanism in engine mount 210 having the construction described above, the rebound stop member 296 and the bound stop member 298 that are both formed separately from the second mounting member 214 are employed, fastening these three members superposed in hermetic fashion over a sufficiently large area, whereby the load withstand strength of the stop mechanisms, including the second mounting member 214, can be effectively assured.

Additionally, since the rebound stop rubber constituting part of the rebound stop mechanism and the bound stop rubber constituting part of the bound stop mechanism are each molded by vulcanization separately from both the rubber elastic body 216 and the diaphragm 230, they are not subject to restriction by the rubber elastic body 216 or diaphragm 230, thereby assuring a degree of freedom in terms of selection of rubber material, etc.

The shape and structure of the orifice passage 290 connecting the pressure receiving chamber 286 and the equilibrium chamber 288 may be modified according to the required vibration damping characteristics and the like. For instance, it is possible to form an orifice passage that extends over a length equivalent to the entire way around the circumference or longer, by means of assembling a separate orifice member.

Figure 10:
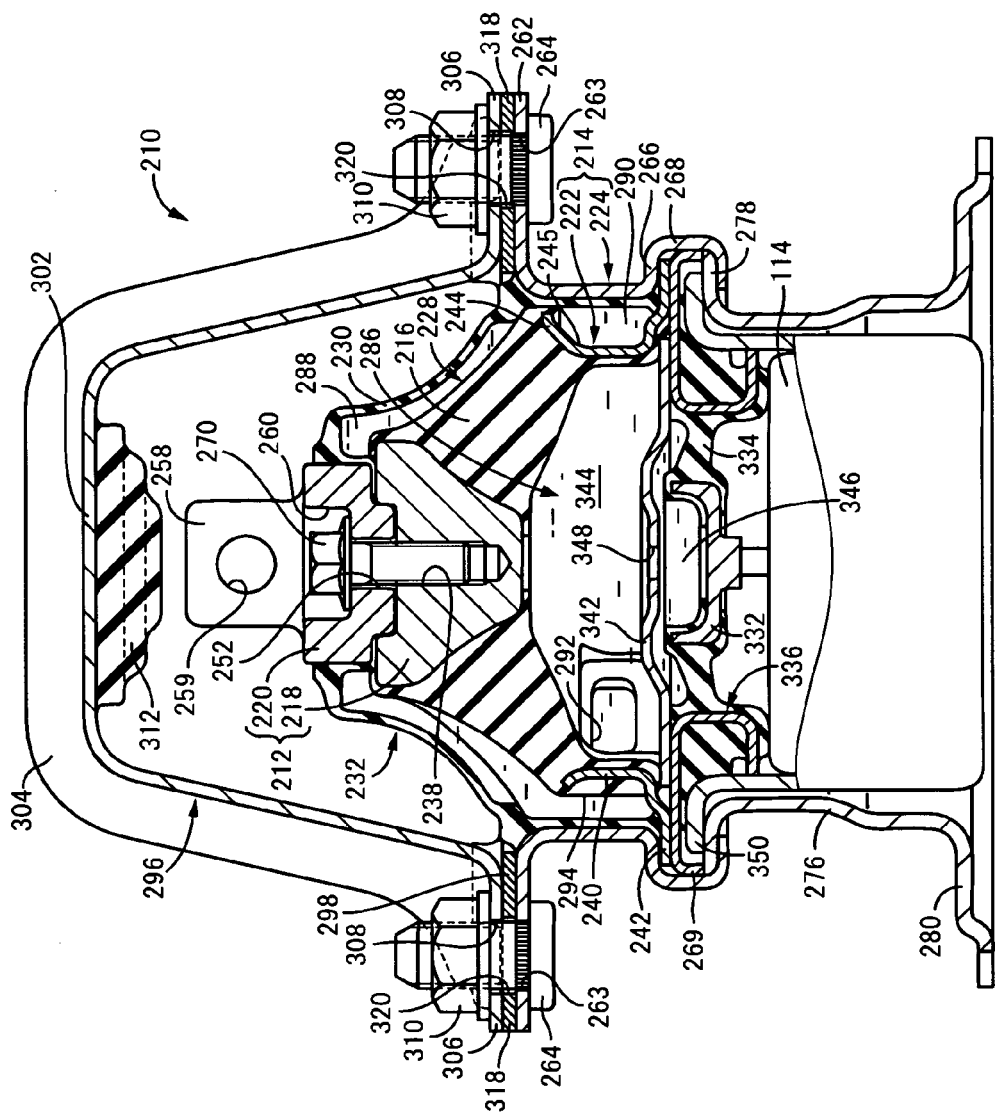
FIG. 10 is an elevational view in axial or vertical cross section of an automotive engine mount constructed according to a third embodiment of the invention.

In the engine mount 210 of the embodiment described above, it would be possible to replace the metallic lid plate 226 installed in the lower opening of the diaphragm-side outer sleeve member 224 of the second mounting member 214 with a generally disk-shaped oscillating plate 332. The disk-shaped oscillating plate 332 is elastically supported at its outside peripheral edge, via an annular disk-shaped support rubber 334, on an annular support member 336 that has been caulked to the diaphragm-side outer sleeve member 224. On the other hand, the vibration damping actuator of the present invention, i.e., the electromagnetic oscillator in this embodiment, is arranged axially below the diaphragm-side outer sleeve member 224, so that oscillation of the oscillating plate 332 in the mount center axis direction (vertical direction in the drawing) is actuated by the electromagnetic oscillator 114, in order to impart an active vibration damping mechanism. FIG. 10 shows such an arrangement, with electromagnetic oscillator 114 installed as the vibration damping actuator of the present invention. Here, a partition metal plate 342 is arranged between the opposed faces of the rubber elastic body 216 and the oscillating plate 332. The outside peripheral edge of the partition metal plate 342 is subjected to caulking force while held between the elastic body-side outer sleeve member 222 and the annular support member 336, whereby the pressure receiving chamber 286 is partitioned into a working chamber 344 and an oscillating chamber 346. This working chamber 344 and oscillating chamber 346 communicate through a communication passage 348 bored through the partition metal plate 342, so that pressure fluctuations produced in oscillating chamber 346 by oscillating actuation of the oscillating plate 332 are transmitted through the communication passage 348 to the working chamber 344. Additionally, the electromagnetic oscillator 114 is mounted to the second mounting member 214 with a flange portion 350 integrally formed on the peripheral edge of the opening of the bottomed cylindrical housing is fixed by caulking to the caulking sleeve portion 268, while supported by the caulking sleeve portion 268.

According to the engine mount 210 of the third embodiment of the present invention, oscillation control of the oscillating plate 332 is controlled in the active vibration damping mechanism thereof at frequency and phase corresponding to input vibration. Therefore, pressure in the pressure-receiving chamber 286 can be actively controlled to adjust vibration damping performance of the engine mount 210, thus permitting the engine mount 210 to exhibit good damping performance over a wider frequency range.

Alternatively, the bound stop member may be constructed with an annular plate configuration superposed around the entire circumference on the upper face of the annular support 262 of the diaphragm-side outer sleeve member 224, with the bound stop rubber provided at several locations.

The means for temporarily attaching the bound stop member 298 to the annular support 262 may be means other than the rivet 325, for example, a convex/concave interlocking structure or the like may be employed. Temporary attachment means are not essential to practice the present invention.

The present invention can be similarly applicable to an automotive body mount or member mount, or in a mount, damper, or other vibration damping device in various non-automotive apparatus, or in a vibration damping actuator for use in such a device.

What is claimed is:

1. A vibration damping actuator comprising:
   a cup-shaped housing;
   a guide hole disposed extending through the housing on the center axis thereof;
   an output member disposed spaced apart from an opening end of the housing;
   an elastic connecting member elastically connecting the output member to the housing;
   a guide rod disposed on the output member and positioned inserted into the guide hole;
   a coil member installed to one of the housing and the output member;
   an armature including a ferromagnetic body and/or a permanent magnet disposed on an other of the housing and the output member, the armature being adapted to exert actuating force on the output member by means of application of electric current to the coil member, causing the output member to undergo oscillating displacement in a center axial direction of the housing, on the basis of guiding action for the guide rod by the guide hole;
   the guide hole open onto a bottom face of the housing;
   an annular shoulder portion formed to an inside of an opening of the guide hole;
   a lid metal plate fitted into the opening of the guide hole with a size enough to prevent inward displacement thereof into the guide hole by the annular shoulder portion;
   an engaging groove disposed on an inner circumferential surface of the opening;
   a snap ring of C-letter shape fitted into the engaging groove to prevent the lid metal plate from becoming dislodged from the opening; a rubber layer boned on and coating substantially entirely an inside face of the lid metal plate; and a sealing rubber layer bonded on and coating the inside face of the lid meal plate, said sealing rubber layer being formed by utilizing an outer peripheral portion of the rubber layer, wherein
   wherein the lid metal plate is pressed by the snap ring of C-letter shape and the sealing rubber layer is pushed against the annular shoulder portion, thereby sealing the opening of the guide hole, and
   a rubber buffer layer positioned in opposition to a distal end portion of the guide rod is formed by a center portion of the rubber layer so that the distal end portion of the guide rod comes into cushioned abutment with the lid metal plate via the rubber buffer layer in order to provide a stop mechanism for cushionwise limiting of an amount of displacement of the output member.

2. A vibration damping actuator according to claim 1, wherein the armature is provided as a separate structure from the output member, and is adjustable in position relative to the output member in the axial direction of the guide hole, and wherein position adjustment operation of the armature relative to the output member is performed through the opening of the guide hole which opens onto the bottom face of the housing.

3. A vibration damping actuator comprising:
   a cup-shaped housing;
   a guide hole disposed extending through the housing on the center axis thereof;
   an output member disposed spaced apart from an opening end of the housing;
   an elastic connecting member elastically connecting the output member to the housing;
   a guide rod disposed on the output member and positioned inserted into the guide hole;
   a coil member installed to one of the housing and the output member;
   an armature including a ferromagnetic body and/or a permanent magnet disposed on an other of the housing and the output member, the armature being adapted to exert actuating force on the output member by means of application of electric current to the coil member, causing the output member to undergo oscillating displacement in a center axial direction of the housing, on the basis of guiding action for the guide rod by the guide hole;
   the guide hole open onto a bottom face of the housing;

an annular shoulder portion formed to an inside of an opening of the guide hole;

a lid metal plate fitted into the opening of the guide hole with a size enough to prevent inward displacement thereof into the guide hole by the annular shoulder portion;

an engaging groove disposed on an inner circumferential surface of the opening;

a snap ring of C-letter shape fitted into the engaging groove to prevent the lid metal plate from becoming dislodged from the opening; and a sealing rubber layer bonded on and coating an inside face of the lid metal plate, wherein the lid metal plate is pressed by the snap ring of C-letter shape and the sealing rubber layer is pushed against the annular shoulder portion, thereby sealing the opening of the guide hole, and wherein the output member is equipped with the guide rod extending toward the armature, the armature has a through hole, the guide rod is passed through the through hole of the armature, and a coil spring is fitted onto an outside of the guide rod between opposed faces of the armature and the output member, while threading a fastening nut onto a distal end portion of the guide rod extending through the armature, to compress the coil spring by a predetermined amount via the armature so that the output member is connected and positioned in an axial or displacement direction of the guide rod relative to the armature, while a first spring seat is disposed on a projecting portion of the guide rod of the output member, with the first spring seat interposed between the output member and an axial end of the coil spring, and between an inner circumferential surface of the axial end of the coil spring and an outer circumferential surface at a basal end of the guide rod.

4. A vibration damping actuator according to claim 3, wherein an outside diameter of the guide rod varies in an axial direction thereof, having large diameter at the basal end thereof, and the first spring seat fits externally onto the basal end of the guide rod.

5. A vibration damping actuator according to claim 3, wherein the inner circumferential surface of the axial end portion of the coil spring fits externally onto the first spring seat.

6. A vibration damping actuator according to claim 3, wherein an outside peripheral edge of the first spring seat is raised in an axial direction thereof towards the coil spring so that the first spring seat has an annular, generally recessed groove shape overall.

7. A vibration damping actuator according to claim 3, wherein a second spring seat is disposed on a coil spring abutting area of the armature, with the second spring seat interposed between the coil spring and the armature.

8. A vibration damping actuator according to claim 3, wherein said elastic connecting member comprises a support rubber elastic body that is bonded by vulcanization to an outside peripheral portion of the output member, while an inner peripheral portion of the output member abutted by the coil spring is substantially devoid of covering by the support rubber elastic body, and the first spring seat is positioned directly onto a surface of the output member.

* * * * *